(12) United States Patent
Nishimori et al.

(10) Patent No.: US 10,651,442 B2
(45) Date of Patent: May 12, 2020

(54) ASSEMBLED CELL

(71) Applicant: HITACHI AUTOMOTIVE SYSTEMS, LTD., Hitachinaka-shi, Ibaraki (JP)

(72) Inventors: Hitoshi Nishimori, Tokyo (JP); Tadashi Yoshida, Tokyo (JP); Jun Oya, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 435 days.

(21) Appl. No.: 14/914,282

(22) PCT Filed: Aug. 6, 2014

(86) PCT No.: PCT/JP2014/070663
§ 371 (c)(1),
(2) Date: Feb. 25, 2016

(87) PCT Pub. No.: WO2015/045632
PCT Pub. Date: Apr. 2, 2015

(65) Prior Publication Data
US 2016/0218339 A1 Jul. 28, 2016

(30) Foreign Application Priority Data

Sep. 24, 2013 (JP) ................................. 2013-196990

(51) Int. Cl.
*H01M 2/14* (2006.01)
*H01M 2/10* (2006.01)
(Continued)

(52) U.S. Cl.
CPC ........... *H01M 2/14* (2013.01); *H01M 2/1077* (2013.01); *H01M 2/18* (2013.01);
(Continued)

(58) Field of Classification Search
CPC ...... H01M 2/14; H01M 2/18; H01M 10/0431; H01M 10/647; H01M 2/1077
See application file for complete search history.

(56) References Cited

U.S. PATENT DOCUMENTS

2006/0240318 A1 10/2006 Kim et al.
2009/0111010 A1 4/2009 Okada et al.
(Continued)

FOREIGN PATENT DOCUMENTS

EP 2 056 392 A1 5/2009
JP 2006-048996 A 2/2006
(Continued)

OTHER PUBLICATIONS

The Extended European Search Report dated Mar. 1, 2017 in the EP Application No. 14849377.8.

*Primary Examiner* — Stephan J Essex
(74) *Attorney, Agent, or Firm* — Volpe and Koenig, P.C.

(57) ABSTRACT

An assembled cell is formed by laminating a plurality of rectangular secondary batteries in a thickness direction and interposing a spacer between the rectangular secondary batteries. The rectangular secondary battery includes an electrode group in which positive and negative electrodes are wound, and the electrode group is housed in the battery container formed in a flat box shape. The spacer includes a contact part which contacts with a width direction end region of a wide side surface of the battery container, a facing part which faces a width direction intermediate region of the wide side surface, and an inclined surface which is adjacent to both ends of the facing part in a width direction of the wide side surface. The inclined surface is inclined such that a thickness of the spacer becomes asymptotically smaller in a direction toward the width direction intermediate region from the width direction end region.

5 Claims, 18 Drawing Sheets

(51) Int. Cl.
*H01M 10/04* (2006.01)
*H01M 2/18* (2006.01)
*H01M 10/613* (2014.01)
*H01M 10/647* (2014.01)
*H01M 10/6557* (2014.01)
*H01M 10/625* (2014.01)

(52) U.S. Cl.
CPC ...... *H01M 10/0431* (2013.01); *H01M 2/1061* (2013.01); *H01M 10/613* (2015.04); *H01M 10/625* (2015.04); *H01M 10/647* (2015.04); *H01M 10/6557* (2015.04); *H01M 2220/20* (2013.01)

(56) References Cited

U.S. PATENT DOCUMENTS

| | | |
|---|---|---|
| 2013/0034768 A1 | 2/2013 | Tsuchiya et al. |
| 2013/0078491 A1 | 3/2013 | Obata |

FOREIGN PATENT DOCUMENTS

| | | |
|---|---|---|
| JP | 2006-310309 A | 11/2006 |
| JP | 2007-115437 A | 5/2007 |
| JP | 2009-110833 A | 5/2009 |
| JP | 2009-277575 A | 11/2009 |
| JP | 2011-151013 A | 8/2011 |
| JP | 2013-033686 A | 2/2013 |
| JP | 2013-073917 A | 4/2013 |
| JP | 2013-149523 A | 8/2013 |
| JP | 2014-010983 A | 1/2014 |
| WO | 2011/158341 A1 | 12/2011 |
| WO | 2013/084290 A1 | 6/2013 |

ASSEMBLED CELL

TECHNICAL FIELD

The present invention relates to an assembled cell in which a plurality of rectangular secondary batteries are laminated with a spacer interposed therebetween.

BACKGROUND ART

In a rechargeable secondary battery field, an aqueous solution based battery such as a lead battery, a nickel cadmium battery or a nickel hydrogen battery has been mainly used. However, as an electric apparatus is downsized and reduced in weight, attention has been given to a lithium ion secondary battery with a high energy density, and research, development and commercialization of the lithium ion secondary battery is rapidly proceeded.

Further, in a view of global warming or depletion of fuel resources, an electric vehicle (EV) or a hybrid electric vehicle (HEV) in which an electric motor assists a part of driving is developed by vehicle manufacturers, and a high-capacity and high-voltage secondary battery is required as a power source of the vehicle. As a power source which meets the requirement, a nonaqueous solution battery with high voltage is focused on. Especially, since a packed rectangular lithium ion secondary battery has an advantage of good volumetric efficiency, expectations for a development of the rectangular lithium ion secondary battery for the HEV or the EV have been increased.

In large current application for the HEV or the EV, heat generation of the battery is unavoidable, and to cool the battery is necessary. Generally, in an assembled cell in which a plurality of batteries electrically connected in series or in parallel, gap is provided between each battery, and the battery is cooled by flowing coolant such as air into the gap. Further, in each battery forming the assembled cell, a battery container may be expanded when an electrode material housed in the battery container is expanded due to charging.

As an assembled cell which is capable of reducing the expansion of the battery container, a secondary battery assembly in which secondary batteries are bound in a state in which a side surface having a maximum area (pressed surface) of outer surfaces of the secondary battery is partially compressed is disclosed (see Patent Literature 1 below).

The secondary battery assembly described in Patent Literature 1 has a purpose, in a secondary battery which is used in a high rate in which the battery is repeatedly charged and discharged with a large current, to reduce a performance degradation of the secondary battery by holding the secondary batteries to keep uniform face pressure on the pressed surface, thus the secondary battery assembly has a contact member and a binding member as a solution means. The contact member has a plurality contact parts which is arranged discretely, each of which contacts with the pressed surface. The contact parts are formed to protrude from a connecting part toward the pressed surface, and the contact parts are arranged or formed to press less strongly a central region of the pressed surface between both one-side regions, the central region corresponding to a part close to the center of a wound electrode body in a winding axis direction. Specifically, to provide the contact member such that top of the contact member which contacts the pressed surface is curved to be concave at the center and pressing force to the pressed surface is different according to parts of the surface is described. On the other hand, to determine an arrangement of each member such that the contact member does not contact with an end part of a cell case in order not to press the end part of the cell case is described.

CITATION LIST

Patent Literature

PTL 1: WO 2011/158341 A

SUMMARY OF INVENTION

Technical Problem

In the secondary battery assembly described in Patent Literature 1, expansion of the pressed surface is prevented by the contact member pressing the pressed surface of the cell. However, since the end part of the cell case is not fixed, a cell tends to move by vibration and the like of the vehicle on which the secondary battery assembly is mounted and there is a problem in positioning the cell. On the other hand, in a case in which the cell case is held by adding pressure on the end part of the cell case, stress concentration on the cell case might be occurred.

An object of the present invention is, in consideration of the above-described problem, to provide an assembled cell which is able to improve positioning accuracy of a rectangular secondary battery by holding the rectangular secondary battery stably and to prevent stress concentration on a battery container and to suppress expansion of the battery container.

Solution to Problem

To achieve the above-described object, an assembled cell of the present invention includes: a plurality of rectangular secondary batteries, each of which has a battery container formed in a flat box shape, and an electrode group in which a positive electrode and a negative electrode are wound, the electrode group being housed in the battery container; and a spacer which is interposed between the rectangular secondary batteries, the assembled cell being formed by the rectangular secondary batteries laminated in a thickness direction, wherein the spacer includes a contact part which contacts with a width direction end region of a wide side surface of the battery container, a facing part which faces a width direction intermediate region of the wide side surface, and an inclined surface which is adjacent to both ends of the facing part in a width direction of the wide side surface, and the inclined surface is inclined such that a thickness of the spacer is decreased in a direction toward the width direction intermediate region from the width direction end region.

Advantageous Effects of Invention

According to an assembled cell of the present invention, positioning accuracy can be enhanced by holding a width direction end region of a wide side surface of a battery container of a rectangular secondary battery between contact parts of spacers, and stress concentration to be occurred on the battery container can be prevented by an inclined surface of the spacer, and expansion of the battery container can be suppressed by a facing part which faces a width direction intermediate region of the wide side surface.

DESCRIPTION OF EMBODIMENTS

Embodiments of a rectangular secondary battery module of an assembled cell of the present invention are described below with reference to drawings.

[Embodiment 1]

(Rectangular Secondary Battery)

Figure 1:
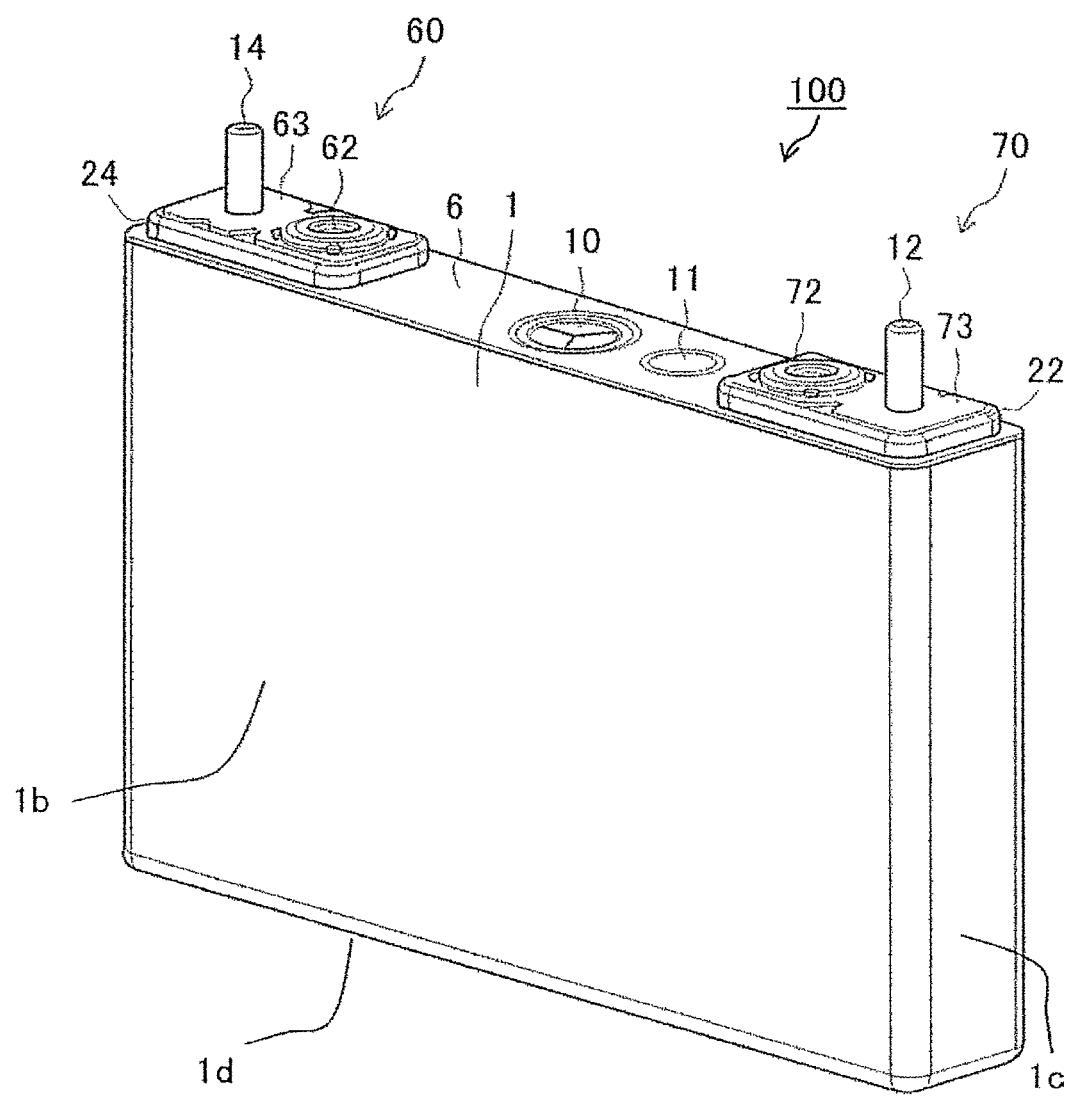
FIG. 1 is a perspective view illustrating an appearance of a rectangular secondary battery.
Figure 2:
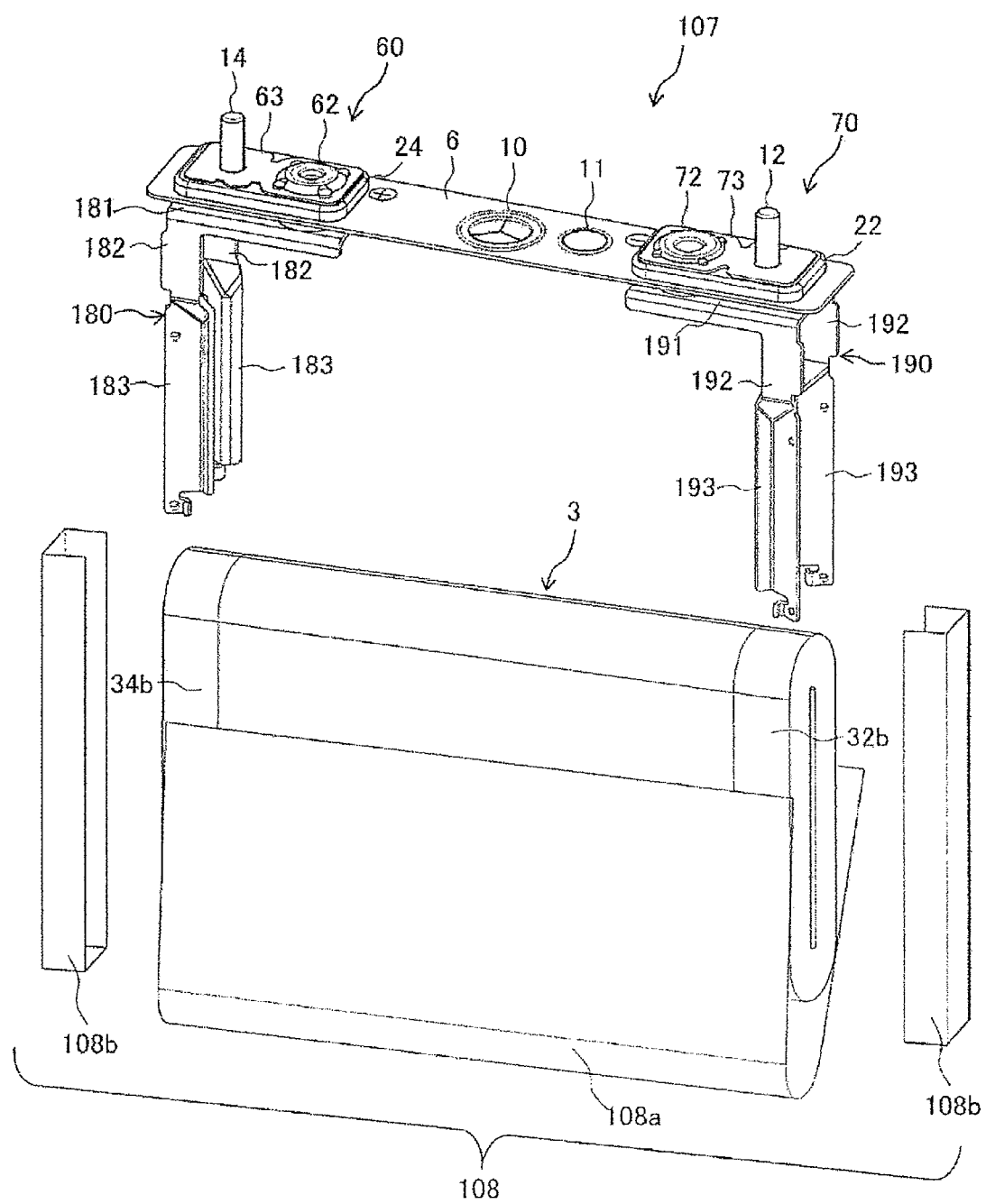
FIG. 2 is an exploded perspective view of the rectangular secondary battery.
Figure 3:
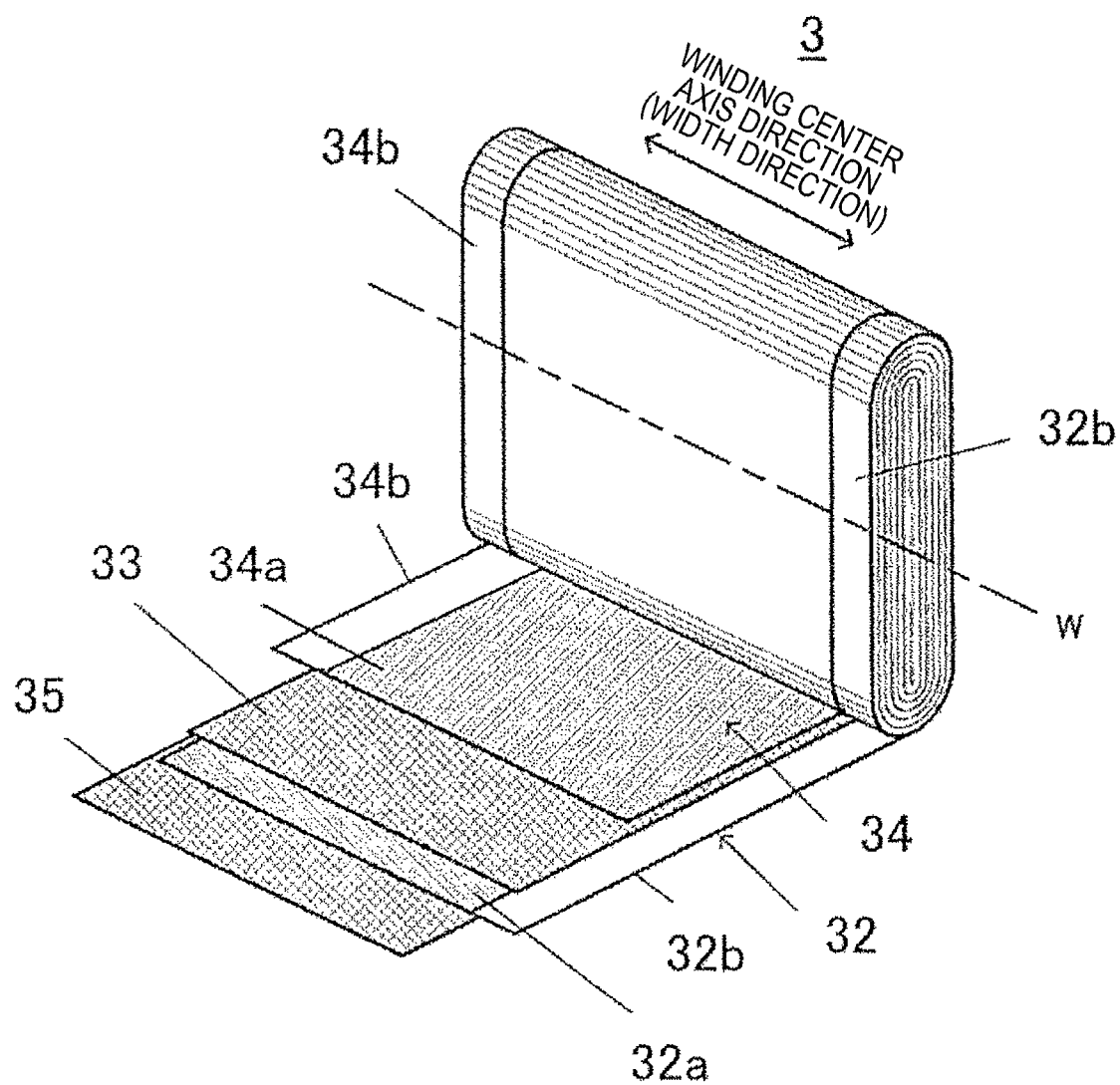
FIG. 3 is a perspective view illustrating a developed wound group.

First, a rectangular secondary battery provided in a rectangular secondary battery module according to this embodiment is described. FIG. 1 is a perspective view illustrating an appearance of a rectangular secondary battery 100 as one example of an electricity storage element, and FIG. 2 is an exploded perspective view illustrating a configuration of the rectangular secondary battery 100. FIG. 3 is a perspective view illustrating a developed wound group 3 provided in the rectangular secondary battery 100.

As shown in FIG. 1, the rectangular secondary battery 100 has a battery container 2 which is provided by a battery can 1 and a battery cover 6. The material of the battery can 1 and the battery cover 6 is aluminum or aluminum alloy. The battery can 1 is formed by a deep drawing to a metal material into a rectangular parallelepiped flat box shape having an opening on one surface. The battery can 1 has a rectangular bottom surface 1d, a pair of wide side surfaces 1b each of which is adjacent to each long side of the bottom surface 1d, and a pair of narrow side surfaces 1c each of which is adjacent to each short side of the bottom surface 1d.

The battery cover 6 has a rectangular flat shape, and welded to the battery can 1 by laser beam welding to cover the opening of the battery can 1. Namely, the battery cover 6 seals the opening of the battery can 1. Further, the battery cover 6 has a positive electrode side terminal component part 60 which is electrically connected to a positive electrode 34 (see FIG. 3) in the wound group 3 and a negative electrode side terminal component part 70 which is electrically connected to a negative electrode 32 (see FIG. 3) in the wound group 3.

The positive electrode side terminal component part 60 is provided with a positive electrode bolt 14, a positive electrode connection terminal 62, a positive electrode outer terminal 63, a positive electrode side outer insulator 24, and a gasket (not shown) and a positive electrode collector 180 which are arranged inside the battery can 1. The positive electrode bolt 14, the positive electrode outer terminal 63, the positive electrode connection terminal 62, the gasket and the positive electrode collector 180 are integrally assembled and mounted to the battery cover 6. In this state, the positive electrode collector 180, the positive electrode connection terminal 62 and the positive electrode outer terminal 63 are electrically connected with each other. Further, the positive electrode collector 180, the positive electrode connection terminal 62 and the positive electrode outer terminal 63 are insulated from the battery cover 6 by the positive electrode side outer insulator 24 and the gasket.

The negative electrode side terminal component part 70 is provided with a negative electrode bolt 12, a negative electrode connection terminal 72, a negative electrode outer terminal 73, a negative electrode side outer insulator 22, and a gasket (not shown) and a negative electrode collector 190 which are arranged inside the battery can 1. The negative electrode side terminal component part 70 has a similar configuration to the positive electrode side terminal component part 60, and the negative electrode bolt 12, the negative electrode outer terminal 73, the negative electrode connection terminal 72 and the negative electrode collector 190 are integrally assembled and mounted to the battery cover 6. In this state, the negative electrode collector 190, the negative electrode connection terminal 72 and the negative electrode outer terminal 73 are electrically connected with each other. Further, the negative electrode collector 190, the negative electrode connection terminal 72 and the negative electrode outer terminal 73 are insulated from the battery cover 6 by the negative electrode side outer insulator 22 and the gasket.

Further, each of the positive electrode bolt 14 and the negative electrode bolt 12 protrudes outward of the battery cover 6 and has a screw construction. Accordingly, when the assembled cell is manufactured, the positive electrode bolt 14 or the negative electrode bolt 12 is inserted into a bus bar (not shown) which has a hole or a notch and assembled by means of a nut. With such a configuration, the positive electrode outer terminal 63 or the negative electrode outer terminal 73 is electrically connected with the bus bar.

Further, the battery cover 6 has a gas exhausting valve 10. The gas exhausting valve 10 is formed by thinning the battery cover 6 partially by press working. Further, the gas exhausting valve may be formed by a thin part of a thin film member to be weld to the opening of the battery cover 6 by laser welding. The gas exhausting valve 10 is torn and reduces the inner pressure of the battery container by exhausting gas in the battery container, when the inner pressure of the battery container is increased and reached to a predetermined pressure by gas generated by heat generation under an abnormal situation such as an overcharging of the rectangular secondary battery 100 and the like.

Further, an electrolyte injection hole (not shown) for injecting an electrolyte into the battery container is provided on the battery cover 6. The electrolyte injection hole is sealed by a sealing plug 11 after the electrolyte is injected into the battery container. As the electrolyte, for example, a non-aqueous electrolyte may be used, in which a lithium salt such as a lithium hexafluorophosphate ($LiPF_6$) is dissolved into a carbon ester-based organic solvent such as an ethylene carbonate.

Next, an inner structure of the battery can 1 is described. As shown in FIG. 2, the wound electrode group 3 (hereinafter also referred to as "wound group") which is held by a cover assembly 107 is housed in the battery can 1. The positive electrode collector 180 to be connected to the positive electrode 34 (see FIG. 3) of the wound group 3, the negative electrode collector 190 to be connected to the negative electrode 32 (see FIG. 3) of the wound group 3 and the wound group 3 are housed in the battery can 1 in a such manner that they are covered with an insulation case 108.

The material of the insulation case 108 is a resin having an electrical insulation property such as a polypropylene, and the battery can 1 and the wound group 3 are electrically isolated from each other by the insulation case 108. Further, in this embodiment, the insulation case 108 is provided with an insulation case wide surface part 108*a* which covers a wide side surface of the wound group 3 and two insulation case end parts 108*b* which cover end parts of the wound group 3, however the insulation case 108 may have a structure in which the insulation case wide surface part 108*a* and the insulation case end part 108*b* are integrated with each other.

The cover assembly 107 is provided by integrally assembling the positive electrode collector 180, the positive electrode connection terminal 62, the positive electrode outer terminal 63, the positive electrode bolt 14, the positive electrode side outer insulator 24, the negative electrode collector 190, the negative electrode connection terminal 72, the negative electrode outer terminal 73, the negative electrode bolt 12, the negative electrode side outer insulator 22, the gasket and the battery cover 6.

The positive electrode outer terminal 63 is electrically connected to the positive electrode 34 (see FIG. 3) of the wound group 3 via the positive electrode collector 180, and the negative electrode outer terminal 73 is electrically connected to the negative electrode 32 (see FIG. 3) of the wound group 3 via the negative electrode collector 190. With this configuration, electricity is provided to an outer device from the wound group 3 via the positive electrode outer terminal 63 and the negative electrode outer terminal 73, or electricity is provided to the wound group 3 from an outer power generator via the positive electrode outer terminal 63 and the negative electrode outer terminal 73 and then the rectangular secondary battery 100 is charged.

The positive electrode collector 180 is formed by aluminum or aluminum alloy. The positive electrode collector 180 has a flat-shaped base part 181 which is mounted along a lower surface of the battery cover 6, a pair of flat parts 182 which is bent downward at 90 degrees at both end parts of the base part 181 in its width direction, and flat-shaped connection flat parts 183 each of which is provided at each distal end of the pair of the flat parts 182. Each connection flat part 183 is connected to the wound group 3 by ultrasonic welding. Each connection flat part 183 is bent at an inclined angle against the flat part 182. The pair of connection flat parts 183 is inclined such that the connection flat parts 183 are receding in a short side direction of the battery cover 6 toward the outside from the center side of the battery cover 6 with respect to a long side direction of the battery cover 6. Both of the inclined directions of the connection flat parts 183 are opposite with each other, and both connection flat parts 183 are arranged at the same angle against the center surface and arranged in linear symmetry to the center surface. The pair of the connection flat parts 183 has a positive electrode foil exposing part 34*b* of the wound group 3 therebetween and is connected to the positive electrode foil exposing part 34*b* by ultrasonic welding in a state in which the positive electrode foil exposing part 34*b* of the wound group 3 is opened into a V-shape.

The negative electrode collector 190 is formed by copper or copper alloy, however the negative electrode collector has a similar configuration to the positive electrode collector 180. The negative electrode collector 190 has a flat-shaped base part 191 which is mounted along a lower surface of the battery cover 6, a pair of flat parts 192 which is bent downward at 90 degrees at both end parts of the base part 191 in its width direction, and flat-shaped connection flat parts 193 each of which is provided at each distal ends of the pair of the flat parts 192. Each connection flat part 193 is connected to the wound group 3 by ultrasonic welding. Each connection flat part 193 is bent at an inclined angle against the flat part 192. The pair of connection flat parts 192 is inclined such that the connection flat parts 192 are receding in a short side direction of the battery cover 6 toward the outside from the center side of the battery cover 6 with respect to a long side direction of the battery cover 6. Both of the inclined directions of the connection flat parts 192 are opposite with each other, and both connection flat parts 192 are arranged at the same angle against the center surface and arranged in linear symmetry to the center surface. The pair of the connection flat parts 193 has a negative electrode foil exposing part 32*b* of the wound group 3 therebetween, and is connected to the negative electrode foil exposing part 32*b* by ultrasonic welding in a state in which the negative electrode foil exposing part 32*b* of the wound group 3 is opened into a V-shape.

Next, the wound group 3 is described. FIG. 3 shows a developed state of a winding end side of the wound group 3. The wound group 3 is a power generation element, which has a layered structure in which the elongate positive electrode 34 and the elongate negative electrode 32 are wound around a winding center axis W in a flat shape with separators 33, 35 interposed between them.

The positive electrode 34 has a positive electrode mixture layer 34*a* provided by coating both surfaces of a positive electrode foil, which is served as a positive electrode collector, with a positive electrode active material mixture, and the positive electrode foil exposing part 34*b* in which the positive electrode active material mixture is not coated is provided at one end part on the positive electrode foil with respect to a width direction of the positive electrode foil. The negative electrode 32 has a negative electrode mixture layer 32*a* provided by coating both surfaces of a negative electrode foil, which is served as a negative electrode collector, with a negative electrode active material mixture, and the negative electrode foil exposing part 32*b* in which the negative electrode active material mixture is not coated is provided at another end part on the negative electrode foil with respect to a width direction of the negative electrode foil. The positive electrode foil exposing part 34b and the negative electrode foil exposing part 32b are areas exposing a metal surface of the electrode foils, and are wound such that the positive electrode foil exposing part 34b and the negative electrode foil exposing part 32b are respectively arranged at one end and another end in a direction of the winding center axis W (width direction in FIG. 3).

As to the negative electrode 32, a negative electrode mixture is provided by adding 10 pts.wt. polyvinylidene fluoride (hereinafter referred to as "PVDF") as a binder into 100 pts.wt. amorphous carbon powder as a negative electrode active material, and then adding and mixing N-methyl pyrrolidone (hereinafter referred to as "NMP") as a dispersant solvent. The negative electrode mixture is coated on both surfaces of a copper foil (negative electrode foil) with a thickness of 10 μm except a welding part (negative electrode foil exposing part 32b). Thereafter the negative electrode 32 having a negative electrode active material coating part with a thickness of 70 μm excluding the thickness of the copper foil is obtained through a drying process, a pressing process and a cutting process.

Here, in this embodiment, the amorphous carbon as the negative electrode active material is utilized as an example, however it is not limited to this. As the negative electrode active material, a natural graphite into or from which lithium ions are insertable or removable, carbon materials such as various artificial graphite materials, coke, or the like, a chemical compound of silicon or tin (for example SiO, TiSi2, etc.), or a composite material thereof may be utilized, and as a particle shape, scale-like, sphere-like, fiber-like, needle-like, mass-like shape or the like shape may be applicable and it is not limited to the specific shape.

As to the positive electrode 34, a positive electrode mixture is provided by adding 10 pts.wt. scale-like graphite as a conductive material and 10 pts.wt. PVDF as a binder into 100 pts.wt. lithium manganate ($LiMn_2O_4$) as a positive electrode active material, and then adding and mixing NMP as a dispersant solvent. The positive electrode mixture is coated on both surfaces of an aluminum foil (positive electrode foil) with a thickness of 20 μm except a welding part (positive electrode foil exposing part 34b). Thereafter the positive electrode 34 having a positive electrode active material coating part with a thickness of 90 μm excluding the thickness of the aluminum foil is obtained through a drying process, a pressing process and a cutting process.

Further, in this embodiment, the lithium manganate is utilized as an example of the positive electrode active material, however other lithium manganate having a spinel crystal structure, a lithium manganese compound oxide in which a part of the lithium manganate is substituted or doped with a metal element, a lithium cobaltate or a lithium titanate having a stratified crystal structure, or a lithium-metal complex oxide in which a part of the lithium cobaltate or the lithium titanate is substituted or doped with a metal element may be utilized.

Further, in this embodiment, PVDF is utilized as an example of a binder for the mixture material layer coating part of the positive electrode 34 and the negative electrode 32, however polymers such as polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various latexes, acrylonitrile, vinyl fluoride, vinylidene fluoride, fluoride propylene, fluoride chloroprene, acrylic resin, or mixtures thereof may be utilized.

As to both end parts in the width direction of the wound group 3, namely a direction of the winding center axis W which is perpendicular to a winding direction, one end part is served as a layered part of the positive electrode 34, and another end part is served as a layered part of the negative electrode 32. The layered part of the positive electrode 34 provided at one end is formed by layering the positive electrode foil exposing part 34b where the positive electrode mixture layer 34a is not formed. The layered part of the negative electrode 32 provided at another end is formed by layering the negative electrode foil exposing part 32b where the negative electrode mixture layer 32a is not formed. Each of the layered part of the positive electrode foil exposing part 34b and the layered part of the negative electrode foil exposing part 32b is pressed in advance and, as mentioned above, connected to the positive electrode collector 180 or the negative electrode collector 190 of the cover assembly 107 by ultrasonic welding and then an electrode group assembly is provided.

(Assembled Cell)

Figure 4:
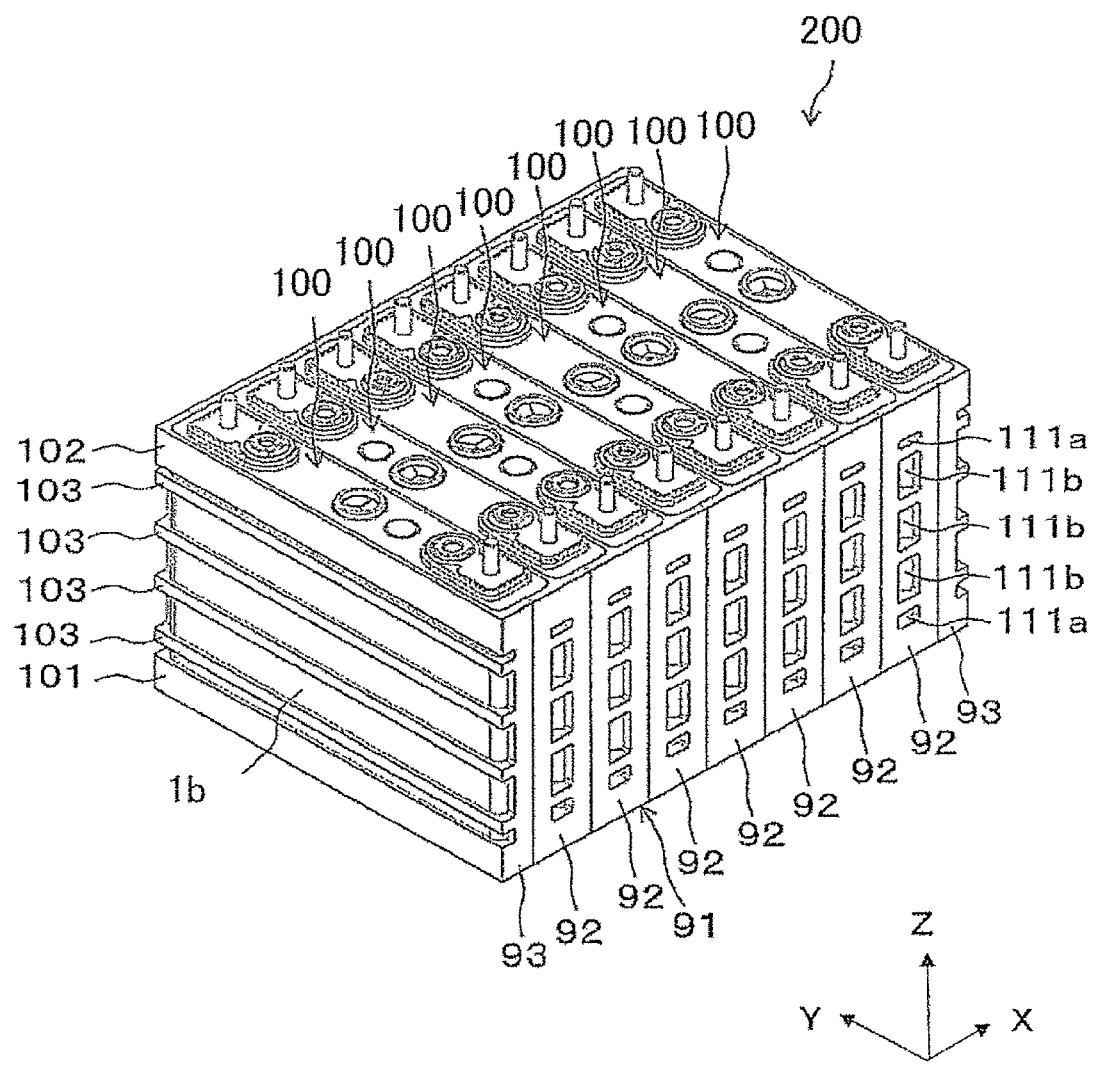
FIG. 4 is a perspective view illustrating an appearance of a rectangular secondary battery module according to Embodiment 1.

Next, the rectangular secondary battery module 200 as the assembled cell according to this embodiment is described. FIG. 4 is a perspective view illustrating the module 200 of this embodiment. Hereinafter, it is described by the orthogonal coordinate system, in which a thickness direction, a width direction and a height direction of the rectangular secondary battery 100 during manufacture of the module 200, which respectively correspond to X-, Y- and Z-directions.

The module 200 includes a plurality of rectangular secondary batteries 100 laminated in the thickness direction (X-direction) and a cell holder 91 which holds the rectangular secondary batteries 100 in a laminated state. The cell holder 91 may be, for example, made of resin material such as glass epoxy resin, polypropylene, polybutyrene telephthalate resin or the like, or metal material such as aluminum, copper, stainless steel or the like.

The cell holder 91 is provided with a plurality of intermediate cell holders 92 and a pair of end cell holders 93. The intermediate cell holder 92 is interposed between the rectangular secondary batteries 100 adjacent to each other. The end cell holder 93 is arranged at both end parts in a laminated direction of the rectangular secondary batteries 100 held by the intermediate cell holder 92, and holds the rectangular secondary battery 100 between the end cell holder 93 and the intermediate cell holder 92. The end cell holder 93 has a shape substantially equal to one of two parts into which the intermediate cell holder 92 is divided with by a plane parallel to the wide side surface 1b of the rectangular secondary battery 100. A plurality of spacers 101, 102, 103 and openings 111a, 111b equipped by the intermediate cell holder 92 and the end cell holder 93 are described later.

Figure 5:
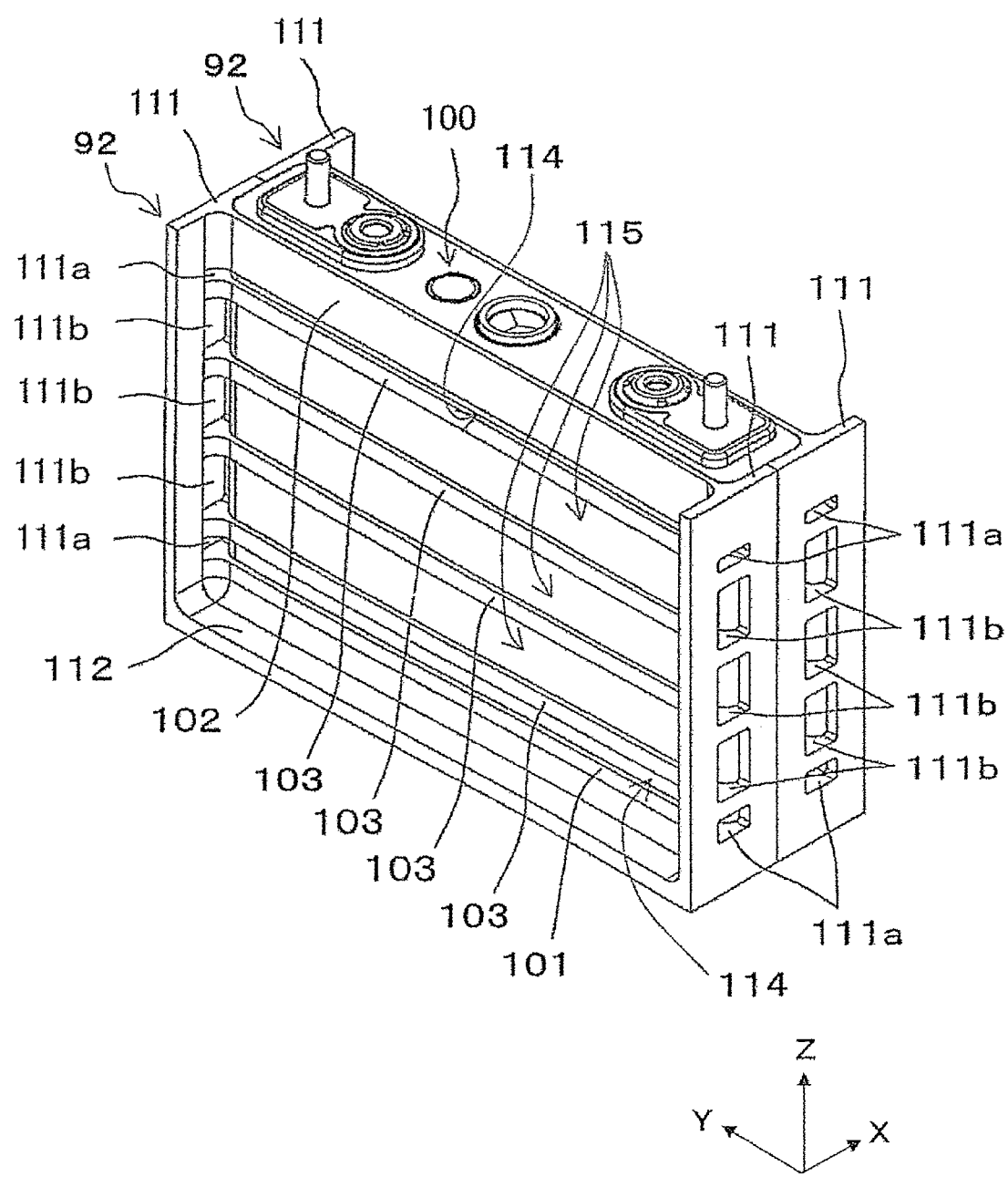
FIG. 5 is a perspective view illustrating the assembled rectangular secondary battery and a pair of cell holders of the module shown in FIG. 4.
Figure 6:
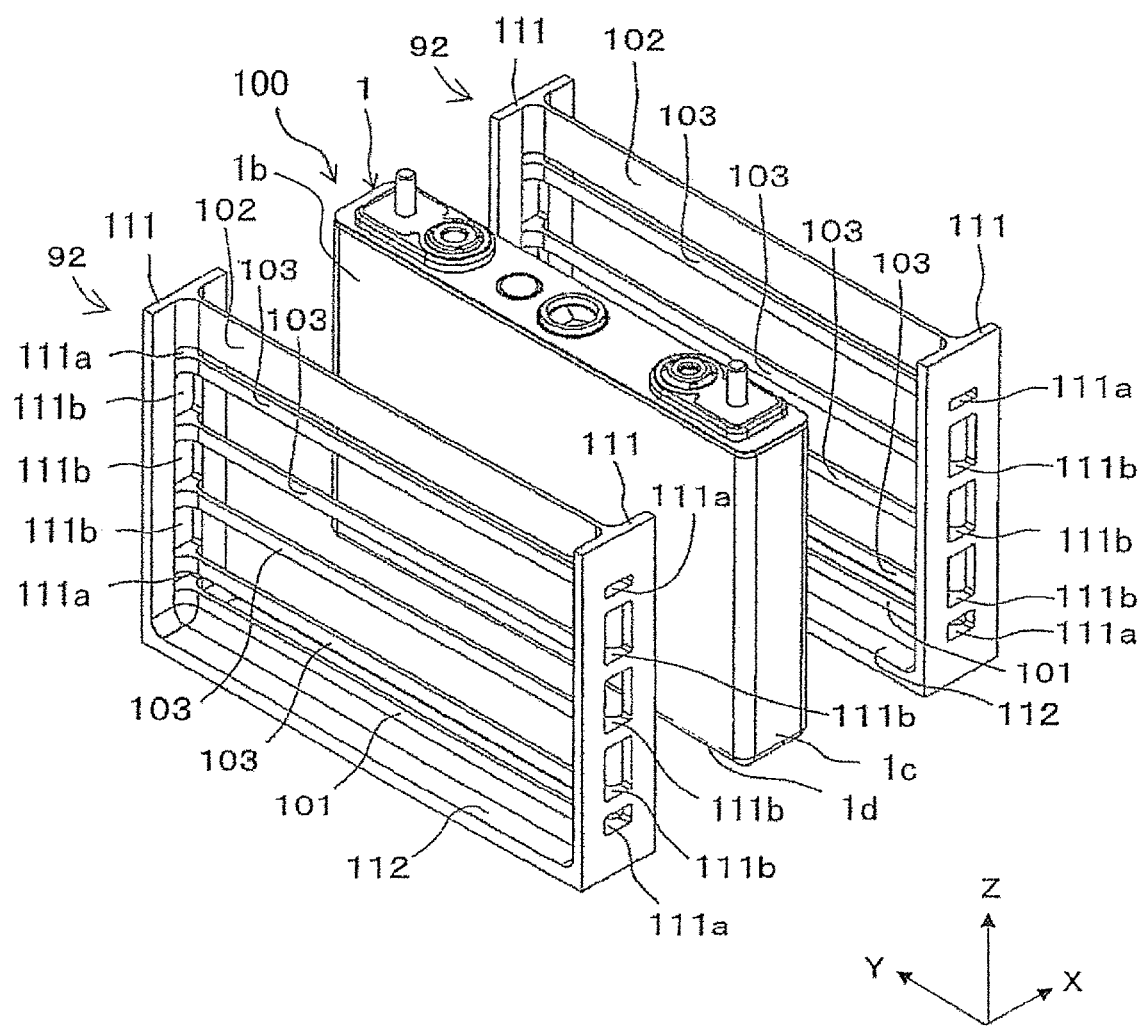
FIG. 6 is an exploded perspective view of the module shown in FIG. 4.

FIG. 5 is a perspective view illustrating an assembled state of the pair of the intermediate cell holders 92 and the rectangular secondary battery 100. FIG. 6 is a perspective view illustrating an exploded state of the pair of the intermediate cell holders 92 and the rectangular secondary battery 100 shown in FIG. 5. The intermediate cell holder 92 is, as shown in FIG. 5 and FIG. 6, provided with a pair of side plates 111, 111 each of which faces each of a pair of narrow side surfaces 1c, 1c of the battery can 1 of the rectangular secondary battery 100, and a bottom plate 112 which faces a bottom surface 1d of the battery can 1. As the intermediate cell holder 92 is arranged between two rectangular secondary batteries 100, the intermediate cell holder 92 is formed plane-symmetrically with respect to a plane passing an intermediate point between two rectangular secondary batteries 100 and being parallel to the wide side surface 1b of the battery can 1. Thus, the side plate 111 and the bottom plate 112 of the intermediate cell holder 92 respectively face substantially half regions in the thickness direction of the battery can 1 of the narrow side surface 1c and the bottom surface 1d of two rectangular secondary batteries 100 arranged both sides of the intermediate cell holder 92.

The pair of side plates 111, 111 is arranged at both end parts of the rectangular secondary battery 100 to face with each other in the width direction (Y-direction) of the wide side surface 1b of the battery can 1, that is in the width direction of the rectangular secondary battery 100, and extended in the laminated direction (X-direction) of the rectangular secondary batteries 100, that is in the thickness direction of the rectangular secondary battery 100. The bottom plate 112 is arranged at a lower part of the rectangular secondary battery 100 in a direction (Z-direction) perpendicular to the bottom surface 1d of the battery can 1, that is in the height direction of the rectangular secondary battery 100, and extended in the laminated direction of the rectangular secondary batteries 100 to connect lower parts of two side plates 111. Further, two intermediate cell holders 92, 92 which are arranged at both sides of the rectangular secondary battery 100 is held in a state in which respective end parts of the side plates 111, 111 and end parts of the bottom plates 112, 112 are contacted or held with slight gap therebetween, and a space for holding the rectangular secondary battery 100 is provided between the intermediate cell holders 92.

The pair of side plates 111, 111 is connected by the plurality of spacers 101, 102, 103. More specifically, the pair of side plates 111, 111 is connected by a lower part spacer 101 which connects lower parts of the side plates 111, 111, an upper part spacer 102 which connects upper parts of the side plates 111, 111 and an intermediate part spacer 103 which connects intermediate parts of the side plates 111, 111. A lower end of the lower part spacer 101 is connected to the bottom plate 112. The upper part spacer 102 is formed wider in the Z-direction than other spacers to correspond to the height from the battery cover 6 to a curved part of the wound group 3 at a side of the battery cover 6, which is housed in the battery can 1. A distance between the lower part spacer 101 and the intermediate part spacer 103 and a distance between the upper part spacer 102 and the intermediate part spacer 103 are shorter than a distance between the intermediate part spacers 103. Each spacer 101, 102, 103 is arranged between two battery cans 1 adjacent to each other. Namely, in the module 200, the rectangular secondary batteries 100 are laminated in the thickness direction by interposing the spacers 101, 102, 103 therebetween.

The side plate 111 includes a first opening 111a and a second opening 111b. The first opening 111a is formed at a position between the lower part spacer 101 and the intermediate part spacer 103 and a position between the upper part spacer 102 and the intermediate part spacer 103 in the Z-direction. The second opening 111b is formed at a position between the intermediate part spacers 103 in the Z-direction. The first opening 111a and the second opening 111b have the same opening width in the X-direction. As to an opening height in the Z-direction of each opening, the opening height of the second opening 111b is larger than the opening height of the first opening 111a in accordance with intervals between respective spacers 101, 102, 103.

The spacers 101, 102, 103 form a plurality of slots 114, 115 extending along the wide side surface 1b of the battery can 1 of the rectangular secondary battery 100 in the width direction (Y-direction) by being arranged at intervals in the Z-direction from each other. As corresponding to the intervals between respective spacers 101, 102, 103, the first slot 114 which has relatively narrow width in the Z-direction is provided between the lower part spacer 101 and the intermediate part spacer 103 and between the upper part spacer 102 and the intermediate part spacer 103. Further, the second slot 115 which has relatively wide width in the Z-direction is provided between the intermediate part spacers 103. The first slot 114 communicates with the first openings 111a of two side plates 111, and the second slot 115 communicates with the second openings 111b of two side plates 111. With such a configuration, a coolant is passed through the slots 114, 115 and it makes possible to cool down the wide side surface 1b of the battery can 1 of the rectangular secondary battery 100.

(Spacer)

Figure 7:
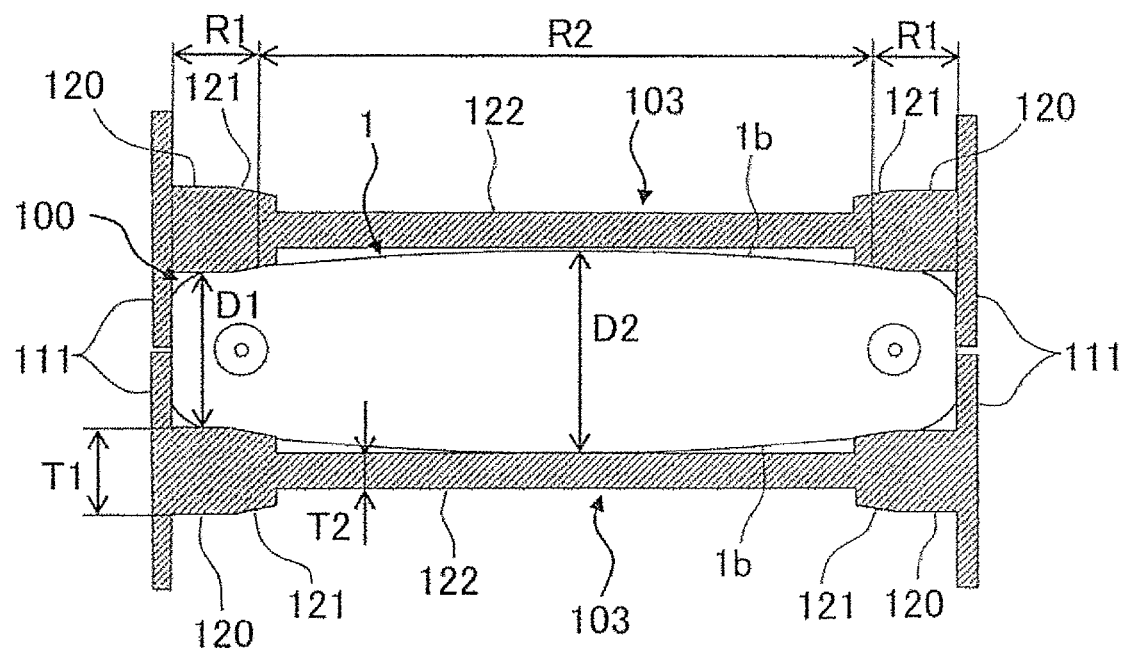
FIG. 7 is a cross-sectional view illustrating a spacer of the module shown in FIG. 4.

A detailed description of a configuration of the intermediate part spacer 103 according to this embodiment is described below. FIG. 7 is a cross-sectional view of the intermediate cell holders 92, 92 taken by a XY-plane to include the intermediate part spacer 103 in the perspective view shown in FIG. 5 which illustrates the assembled state of the pair of intermediate cell holders 92, 92 and the rectangular secondary battery 100.

The spacer 103 is divided into a plurality of parts in the height direction (Z-direction) of the wide side surface 1b of the battery can 1. Specifically, in examples shown in FIG. 5 and FIG. 6, the spacer 103 is divided into four parts. The spacer 103 includes, as shown in FIG. 7, a contact part 120 which contacts with a width direction end region R1 of the wide side surface 1b of the battery can 1 forming the battery container 2, a facing part 122 which faces a width direction intermediate region R2 of the wide side surface 1b, and an inclined surface 121 which is adjacent to both ends of the facing part 122 in the width direction (Y-direction) of the wide side surface 1b. Here, the width direction end region R1 corresponds to a region starting from the end part toward the center of the wide side surface 1b of the battery can 1 in the width direction and having a predetermined width shorter than a length between the end part and the center of the wide side surface 1b of the battery can 1 in the width direction, and the width direction intermediate region R2 corresponds to a region between the width direction end regions R1.

The contact part 120 is provided at both end parts of the spacer 103 in the width direction of the wide side surface 1b, and protruded toward the wide side surface 1b of the rectangular secondary battery 100 compared to the facing part 122. Namely, a thickness T1 of the contact part 120 in the thickness direction (X-direction) of the rectangular secondary battery 100 is thicker than a thickness T2 of the facing part 122 in the same direction. With such a configuration, in the pair of spacers 103, 103 facing each other, an interval D1 between the contact parts 120, 120 is narrower than an interval D2 between the facing parts 122, 122. In other words, the interval D2 between the facing parts 122, 122 is larger than the interval D1 between the contact parts 120, 120. Further, surfaces of the contact part 120 and the facing part 122 which face the wide side surface 1b of the battery can 1 are respectively provided as a flat surface parallel to the width direction (Y-direction) and the height direction (Z-direction) of the rectangular secondary battery 100.

The inclined surface 121 is inclined to asymptotically decrease a thickness of the spacer 103 with respect to the thickness direction of the rectangular secondary battery 100 in a direction toward the facing part 122 from the contact part 120, namely toward the width direction intermediate region R2 from the width direction end region R1 of the wide side surface 1b of the battery can 1. That is, in an example shown in FIG. 7, the inclined surface 121 is inclined to decrease the thickness T1 of the contact part 120 of the spacer 103 in a direction toward the width direction intermediate region R2 from the width direction end region R1. The inclined surface 121 may be formed, for example in a linearly tapered shape or a curved shape with a predetermined curvature radius which connects the contact part 120 and the facing part 122, in the cross-sectional view shown in FIG. 7.

Figure 8:
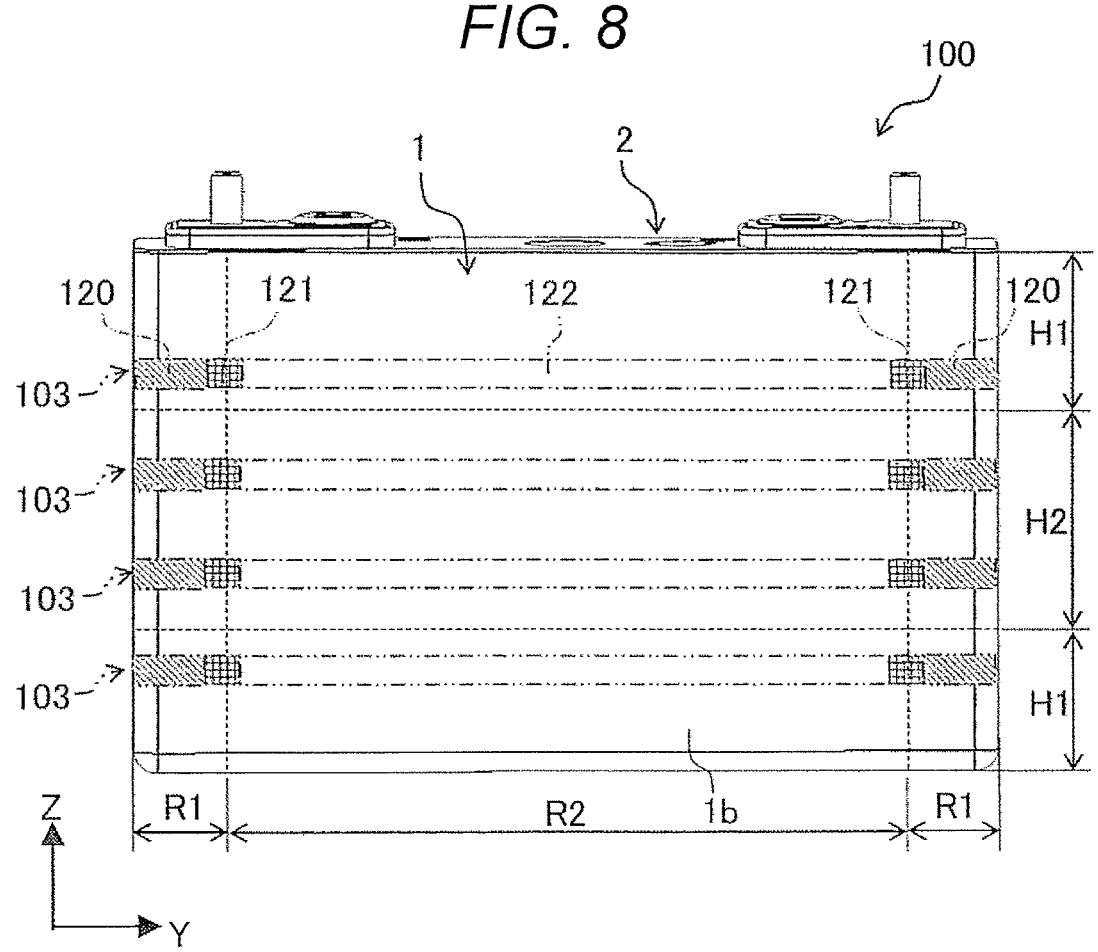
FIG. 8 is a front view which indicates a positional relationship between the spacer and the rectangular secondary battery of the module shown in FIG. 4.

FIG. 8 is a front view which indicates a positional relationship between four of the intermediate part spacers 103 provided in the intermediate cell holder 92 and the end cell holder 93 which form the cell holder 91 and the wide side surface 1b of the battery can 1. Here, the configuration of the cell holder 91 except the intermediate part spacer 103, which includes the lower part spacer 101 and the upper part spacer 102, is omitted to illustrate.

The contact part 120 is provided at both ends of respective four spacers 103, and contacts with the width direction end region R1 of the wide side surface 1b of the battery can 1. The facing part 122 faces the width direction intermediate region R2 of the wide side surface 1b. In the width direction of the wide side surface 1b, the inclined surface 121 is arranged inside the contact part 120, and the facing part 122 is arranged inside the inclined surface 121. The inclined surface 121 is arranged at a whole region in the height direction (Z-direction) of the wide side surface 1b, namely at a position facing a height direction end region H1 and a height direction intermediate region H2, and arranged between the contact part 120 and the facing part 122 in the width direction (Y-direction) of the wide side surface 1b.

Here, the height direction end region H1 corresponds to a region starting from the upper end or the lower end toward the center of the wide side surface 1b of the battery can 1 in the height direction and having a predetermined width shorter than a length between the upper end part or the lower end part and the center of the wide side surface 1b of the battery can 1, and the height direction intermediate region H2 corresponds to a region between the height direction end regions H1, H1, which includes the center of the wide side surface 1b in the height direction. The contact parts 120 have the same length in the Y-direction between the four spacers 103, as well as the inclined surfaces 121 and the facing parts 122.

Next, a function of the spacer 103 according to this embodiment is described. When the assembled cell 200 is manufactured, the battery can 1 which forms the battery container as described above is expanded by charging respective rectangular secondary batteries 100. When the battery can 1 is expanded, the battery can 1 has a cross-sectional shape along the width direction, in which expansion of the center of the battery can 1 in the width direction is the largest and expansion is decreased asymptotically toward the end part in the width direction. The assembled cell 200 is manufactured by laminating the above-described expanded rectangular secondary batteries 100 in a state that the intermediate cell holder 92 is interposed therebetween, and arranging the end cell holders 93 at both end parts in the laminated direction and then applying a compression load in the laminated direction.

At this time, the contact parts 120 of the intermediate part spacer 103 of the intermediate cell holder 92 and the end cell holder 93 contact with the width direction end region R1 of the wide side surface 1b of the battery can 1 and apply a load on the battery can 1 in the thickness direction. With such a configuration, expansion of the battery can 1 in the width direction end region R1 of the wide side surface 1b of the battery can 1 is suppressed, and the width direction end region R1 of the wide side surface 1b is held stably and positioned precisely by the contact part 120 of the spacer 103. Further, the height direction end region H1 of the wide side surface 1b of the battery can 1 is held stably and positioned precisely by the lower part spacers 101 and the upper part spacers 102 of the intermediate cell holder 92 and the end cell holder 93.

Further, in a case in which a thickness of the expanded battery can 1 is larger than the interval D2 between the facing parts 122, 122 of the pair of spacers 103, 103 arranged at both sides of the battery can 1 in the thickness direction to face each other, the facing parts 122 contact with the wide side surface 1b, 1b of the battery can 1 and the wide side surface 1b of the battery can 1 is compressed in the thickness direction by the pair of facing parts 122, 122 facing each other. With such a configuration, expansion of the wide side surface 1b of the battery can 1 forming the battery container 2 can be suppressed and to reduce a performance degradation of the battery becomes possible.

Further, the spacer 103 according to this embodiment has, as shown in FIG. 7, the inclined surface 121 which is adjacent to the facing part 122 in the width direction of the wide side surface 1b of the battery can 1, and the inclined surface 121 is inclined such that the thickness of the spacer 103 is decreased in a direction toward the width direction intermediate region R2 from the width direction end region R1. Namely, the inclined surface 121 is inclined along the wide side surface 1b of the battery can 1 expanded in a convex curved manner in which the thickness of the center part of the battery can 1 is the largest. Accordingly, when the wide side surface 1b of the expanded battery can 1 is pressed by the contact part 120 or the facing part 122 of the spacer 103, the spacer 103 can prevent stress concentration from occurring on the wide side surface 1b of the battery can 1. With such a configuration, both of enhancing a reliability of the battery can 1 and reducing a performance degradation of the battery become possible.

For example, in a configuration in which an inclined angle of the inclined surface 121 against the width direction (Y-direction) of the wide side surface 1b of the battery can 1 is smaller than an inclined angle of the wide side surface 1b of the expanded battery can 1, the inclined surface 121 is able to not only suppress expansion of the wide side surface 1b by contacting with the wide side surface 1b but also reduce stress applied on the wide side surface 1b compared to a configuration in which the inclined surface 121 is not formed. Further, in a configuration in which the inclined angle of the inclined surface 121 is substantially equal to the inclined angle of the wide side surface 1b of the expanded battery can 1, the inclined surface 121 is able to further reduce stress applied on the wide side surface 1b by contacting substantially whole area of the inclined surface 121 with the wide side surface 1b. Further, in a configuration in which the inclined angle of the inclined surface 121 is larger than the inclined angle of the wide side surface 1b, contact of the spacer 103 and the wide side surface 1b in a region between the contact part 120 and the facing part 122 is avoided, and stress concentration to be occurred between the inclined surface 121 and the wide side surface 1b of the battery can 1 is prevented.

Here, the interval D2 between the pair of facing parts 122, 122 is set to prevent expansion of the battery can 1 by contacting the facing part 122 with the wide side surface 1b of the battery can 1, when expansion of the battery can 1, which leads to a performance degradation of the rectangular secondary battery 100, is occurred. Accordingly, in a case in which expansion of the battery can 1, which leads to the performance degradation, is not occurred, the facing part 122 does not contact with the wide side surface 1b of the battery can 1.

As described above, according to the rectangular secondary battery module 200 as the assembled cell of this embodiment, positioning accuracy of the rectangular secondary battery 100 can be improved by stably holding the width direction end region R1 of the wide side surface 1b of the battery can 1 which forms the battery container 2 of the rectangular secondary battery 100 by the contact parts 120, 120 of the spacers 103, 103. Further, stress concentration on the wide side surface 1b can be prevented by the inclined surface 121, and expansion of the battery container 2 can be suppressed by the facing part 122 which faces the width direction intermediate region R2 of the wide side surface 1b.

[Embodiment 2]

Figure 9:
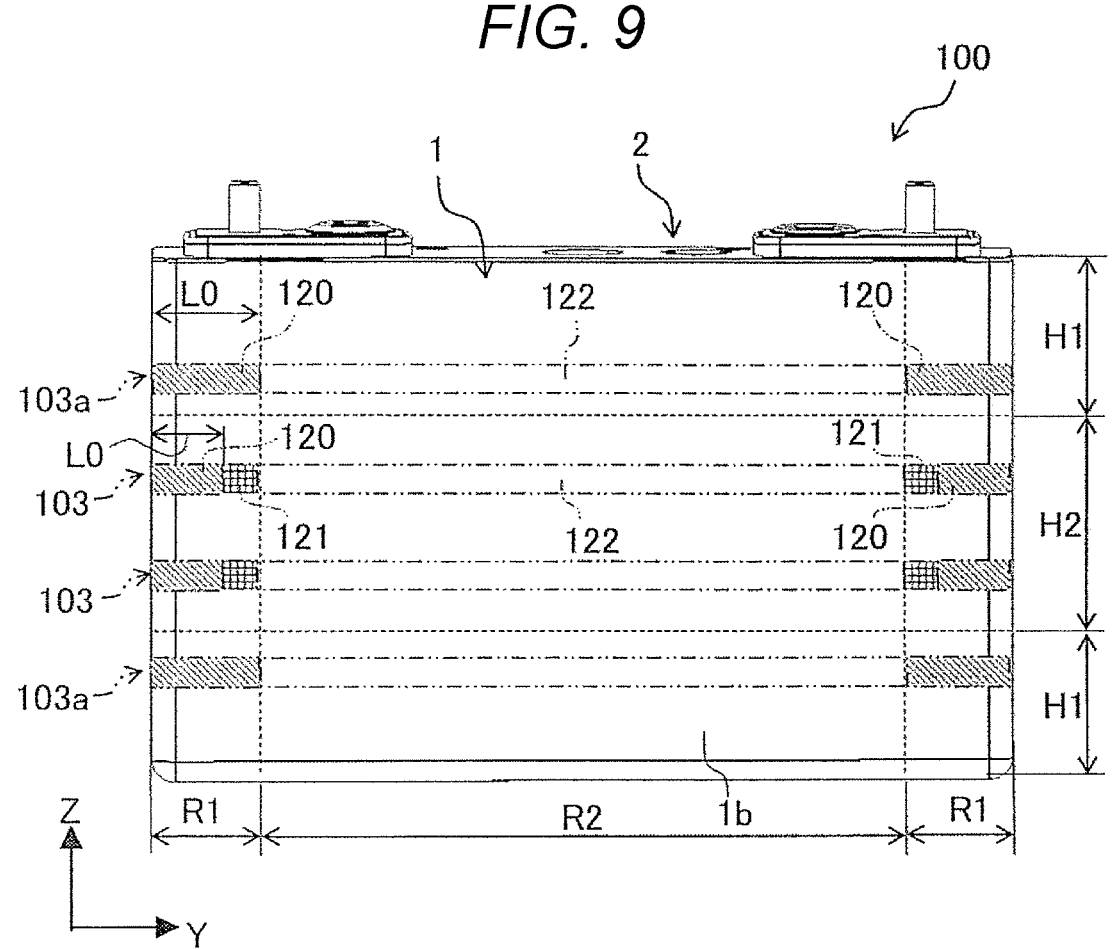
FIG. 9 is a front view which indicates a positional relationship between a rectangular secondary battery and a spacer of a module according to Embodiment 2.

Next, an assembled cell of the present invention according to Embodiment 2 is described with reference to FIGS. 1 to 7 and FIG. 9. FIG. 9 is a front view which indicates a positional relationship between a rectangular secondary battery 100 and intermediate part spacers 103, 103a of a rectangular secondary battery module as the assembled cell of this embodiment, which corresponds to FIG. 8 of Embodiment 1.

In the module of this embodiment, the intermediate part spacer 103a which is provided in an intermediate cell holder 92 and an end cell holder 93 forming a cell holder 91 is different from the intermediate part spacer 103 of Embodiment 1 described above. Other configurations of the module of this embodiment are the same as those of the module 200 of the above-described Embodiment 1, and therefore the same reference numerals are assigned to the same configurations and the explanation of the configurations is omitted.

In this embodiment, two spacers 103, 103 which face a height direction intermediate region H2 of a wide side surface 1b of a battery can 1 has the same structure as the spacer 103 of Embodiment 1. On the other hand, two spacers 103a, 103a which face height direction end regions H1, H1 of the wide side surface 1b of the battery can 1 are different from the spacer 103 of Embodiment 1 in the point in which the inclined surface 121 is not formed.

Namely, in this embodiment, the inclined surface 121 which is provided in the spacers 103, 103 is arranged at a position facing the height direction intermediate region H2 of the wide side surface 1b of the battery can 1 and arranged between a contact part 120 and a facing part 122 in a width direction (Y-direction) of the wide side surface 1b. Further, a length L0 of the contact part 120 of the spacer 103a in the width direction of the wide side surface 1b, which faces the height direction end region H1 of the wide side surface 1b, is longer than a length L0 in the same direction of the contact part 120 of the spacer 103 arranged between those spacers 103a. Namely, the length L0 of the contact part 120 along the width direction of the wide side surface 1b becomes asymptotically longer in a direction toward the height direction end region H1 from the height direction intermediate region H2.

When the battery can 1 is expanded, a thickness of the battery can 1 is the largest at the center in both the height direction (Z-direction) and the width direction (Y-direction) of the wide side surface 1b of the battery can 1 and the thickness becomes smaller toward the end parts in each directions. Thus, even though the inclined surface 121 is not provided in the spacer 103a which faces the height direction end region H1 such as the module of this embodiment, stress concentration on the battery can 1 may not be occurred.

Accordingly, according to the assembled cell of this embodiment, since the spacer 103 facing the height direction intermediate region of the wide side surface 1b of the battery can 1, which has the same configuration as that of Embodiment 1, is provided, a similar effect to that of the module 200 of Embodiment 1 is obtained. In addition, since the length L0 of the contact part 120 along the width direction of the wide side surface 1b becomes asymptotically longer in a direction toward the height direction end region H1 from the height direction intermediate region H2, in the height direction end region H1 of the wide side surface 1b of the battery can 1, the width direction end region R1 of the wide side surface 1b can be held stably by the relatively longer contact part 120 of the spacer 103a.

[Embodiment 3]

Figure 10:
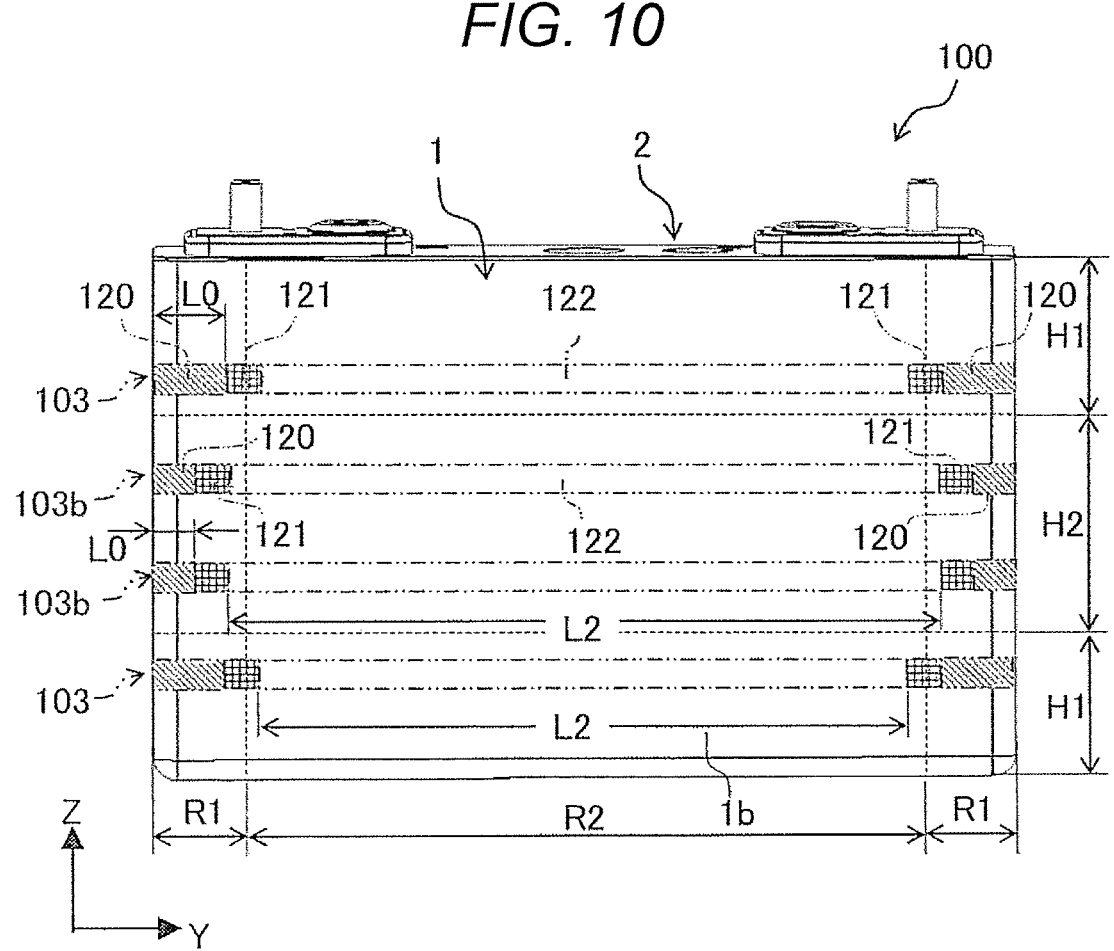
FIG. 10 is a front view which indicates a positional relationship between a spacer and a rectangular secondary battery of a module according to Embodiment 3.

Next, an assembled cell of the present invention according to Embodiment 3 is described with reference to FIGS. 1 to 7 and FIG. 10. FIG. 10 is a front view which indicates a positional relationship between a rectangular secondary battery 100 and intermediate part spacers 103, 103b of a rectangular secondary battery module as the assembled cell of this embodiment, which corresponds to FIG. 8 of Embodiment 1.

In the module of this embodiment, a length L2 of a facing part 122 of the spacer 103b in a width direction (Y-direction) of a wide side surface 1b, which faces a height direction intermediate region H2 of the wide side surface 1b of a battery can 1, is longer than a length L2 in the same direction of the facing part 122 of the spacer 103 which faces a height direction end region H1. Namely, the length L2 of the facing part 122 along the width direction of the wide side surface 1b becomes asymptotically longer in a direction toward the height direction intermediate region H2 from the height direction end region H1.

Further, a length L0 in the same direction of the contact part 120 of the spacer 103 which faces the height direction end region H1 is longer than a length L0 in the same direction of the contact part 120 of the spacer 103b which faces the height direction intermediate region H2. Namely, the length L0 of the contact part 120 along the width direction of the wide side surface 1b of the battery can 1 becomes asymptotically longer in a direction toward the height direction end region H1 from the height direction intermediate region H2. Other configurations of the module of this embodiment are the same as those of the module 200 of the above-described Embodiment 1, and therefore the same reference numerals are assigned to the same configurations and the explanation of the configurations is omitted.

As described above, when the battery can 1 is expanded, a thickness of the battery can 1 is the largest at the center in both the height direction and the width direction of the wide side surface 1b of the battery can 1, and the thickness becomes smaller toward the end parts in each directions. According to the module of this embodiment, a similar effect to that of the module 200 of the above-described Embodiment 1 is obtained, and with such a configuration in which the length L0 of the contact part 120 is set to become asymptotically longer in a direction toward the height direction end region H1 from the height direction intermediate region H2 of the wide side surface 1b, the width direction end region R1 can be held stably by the relatively longer contact part 120 in the height direction end region H1 of the battery can 1.

Further, since the length L2 of the facing part 122 along the width direction of the wide side surface 1b of the battery can 1 becomes asymptotically longer in a direction toward the height direction intermediate region H2 from the height direction end region H1, in the height direction intermediate region H2, positions of the contact parts 120 are set to be close to both end parts of the spacer 103b. Accordingly, in the height direction intermediate region H2, stress concentration in the width direction end region R1 of the wide side surface 1b of the battery can 1 can be further relaxed.

[Embodiment 4]

Figure 11:
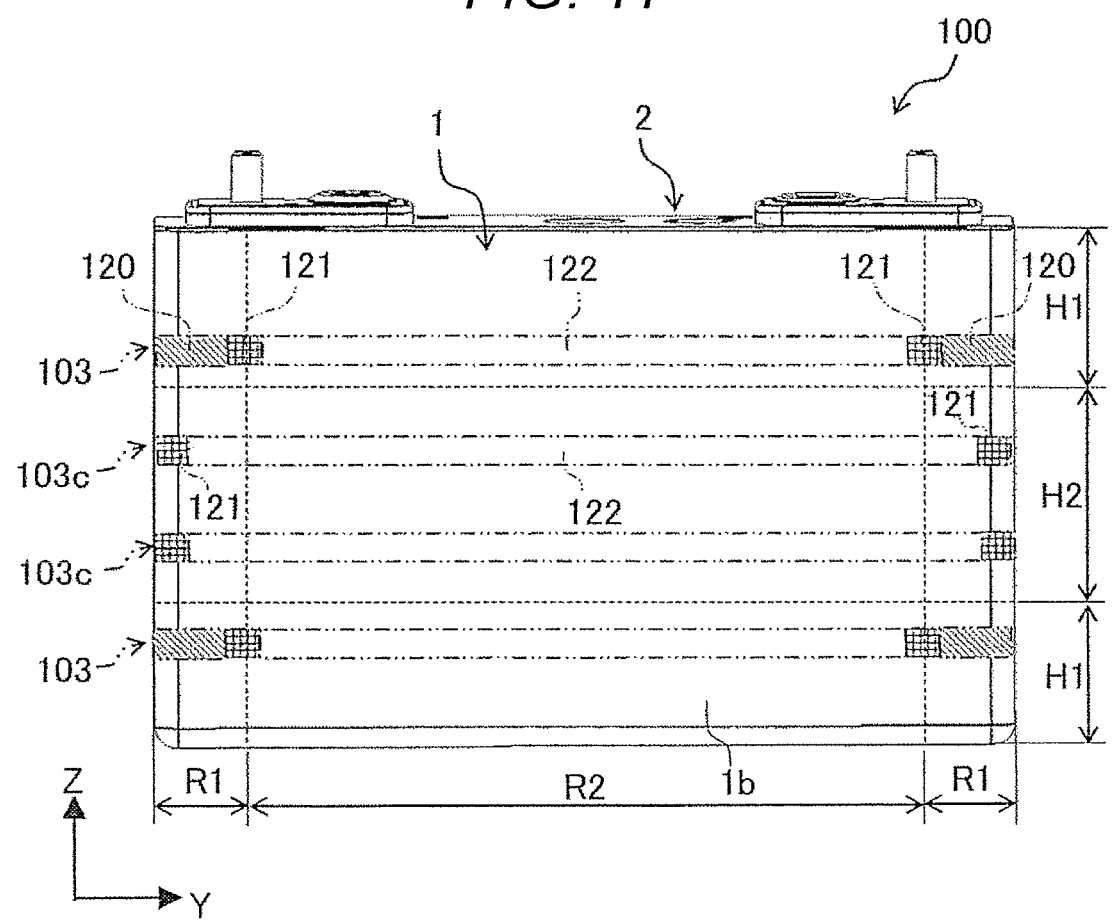
FIG. 11 is a front view which indicates a positional relationship between a spacer and a rectangular secondary battery of a module according to Embodiment 4.

Next, an assembled cell of the present invention according to Embodiment 4 is described with reference to FIGS. 1 to 7 and FIG. 11. FIG. 11 is a front view which indicates a positional relationship between a rectangular secondary battery 100 and intermediate part spacers 103, 103c of a rectangular secondary battery module as the assembled cell of this embodiment, which corresponds to FIG. 8 of Embodiment 1.

In the module of this embodiment, the spacer 103 which is arranged at a position facing a height direction end region H1 among the intermediate part spacers 103, 103c has, similar to the spacer 103 of Embodiment 1, a contact part 120, an inclined surface 121 and a facing part 122. On the other hand, the spacer 103c which is arranged at a position facing a height direction intermediate region H2 has the inclined surface 121 and the facing part 122, but the spacer 103c does not have the contact part 120.

Namely, in the spacer 103 which faces the height direction end region H1 of the wide side surface 1b, the inclined surface 121 is arranged between the contact part 120 and the facing part 122 in the width direction of the wide side surface 1b. On the other hand, in the spacer 103c which faces the height direction intermediate region H2, the inclined surface 121 is arranged at both end parts in the width direction of the wide side surface 1b of the battery can 1. Other configurations of the module of this embodiment are the same as those of the module 200 of the above-described Embodiment 1, and therefore the same reference numerals are assigned to the same configurations and the explanation of the configurations is omitted.

As described above, when the battery can 1 is expanded, a thickness of the battery can 1 is the largest at the center in both the height direction and the width direction of the wide side surface 1b of the battery can 1, and the thickness becomes smaller toward the end parts in each directions. Thus, since the spacer 103 which has similar configuration to that of Embodiment 1 is arranged at the position facing the height direction end region H1 of the wide side surface 1b of the battery can 1 and the spacer 103c which faces the height direction intermediate region H2 does not have the contact part 120, not only a similar effect to that of the module 200 of Embodiment 1 is obtained but also to further relax stress concentration in the height direction intermediate region H2 becomes possible.

[Embodiment 5]

Figure 12:
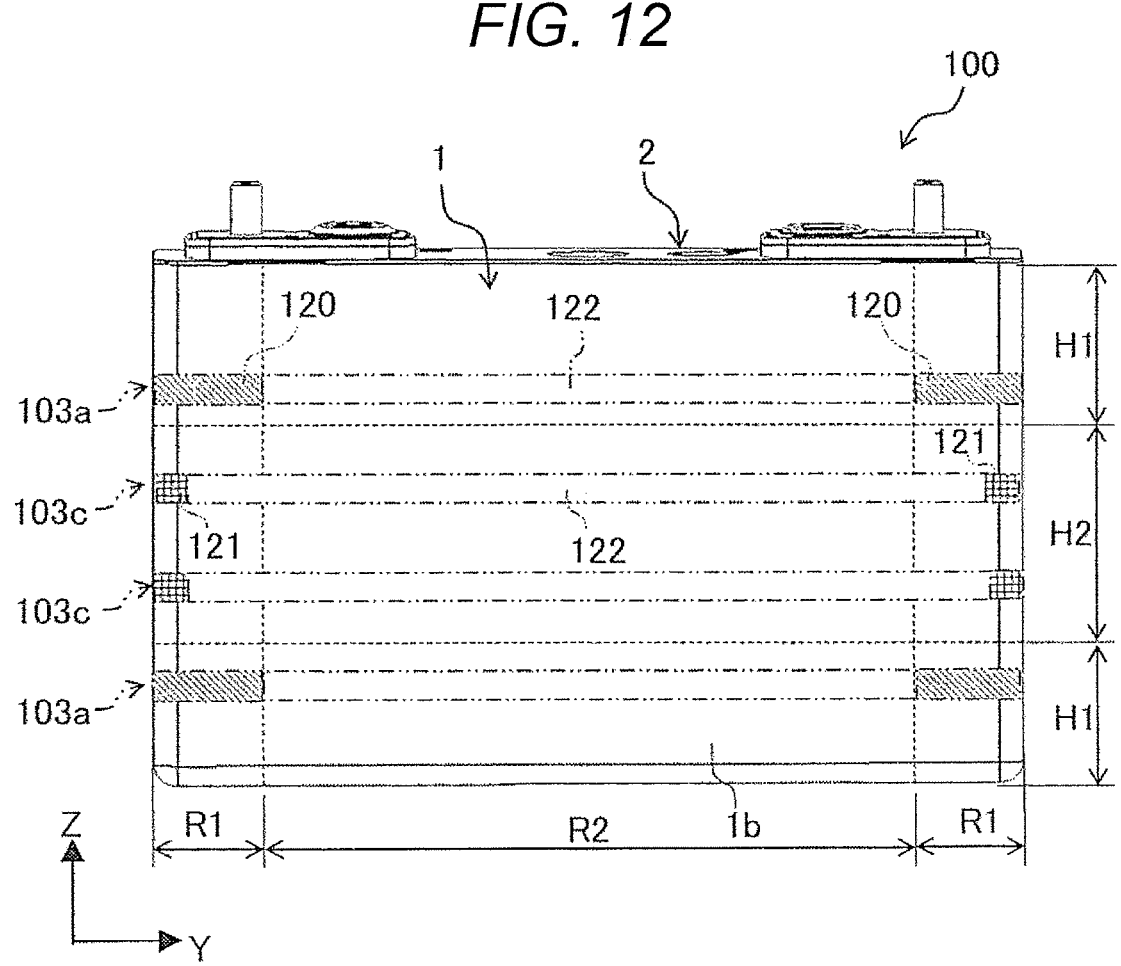
FIG. 12 is a front view which indicates a positional relationship between a spacer, a rectangular secondary battery and a spacer of a module according to Embodiment 5.

Next, an assembled cell of the present invention according to Embodiment 5 is described with reference to FIGS. 1 to 7 and FIG. 12. FIG. 12 is a front view which indicates a positional relationship between a rectangular secondary battery 100 and intermediate part spacers 103a, 103c of a rectangular secondary battery module as the assembled cell of this embodiment, which corresponds to FIG. 8 of Embodiment 1.

In the module of this embodiment, the spacer 103a which faces a height direction end region H1 of a wide side surface 1b of a battery can 1 has a similar configuration to the spacer 103a of the above-described Embodiment 2, and the spacer 103c which faces a height direction intermediate region H2 of the wide side surface 1b has a similar configuration to the spacer 103c of the above-described Embodiment 4.

Namely, the spacer 103a which is arranged at a position facing the height direction end region H1 among the intermediate part spacers 103a, 103c has a contact part 120 and a facing part 122, but the spacer 103a does not have an inclined surface 121. On the other hand, the spacer 103c which is arranged at a position facing the height direction intermediate region H2 has the inclined surface 121 and the facing part 122, but the spacer 103 does not have the contact part 120. Other configurations of the module of this embodiment are the same as those of the module 200 of the above-described Embodiment 1, and therefore the same reference numerals are assigned to the same configurations and the explanation of the configurations is omitted.

As described above, when the battery can 1 is expanded, a thickness of the battery can 1 is the largest at the center in both a height direction and a width direction of the wide side surface 1b of the battery can 1, and the thickness becomes smaller toward the end parts in each directions. According to the module of this embodiment, since the spacer 130a which is arranged at the position facing the height direction end region H1 of the wide side surface 1b of the battery can 1 has a similar configuration to the spacer 130a of Embodiment 2 and the spacer 103c which is arranged at the position facing the height direction intermediate region H2 has a similar configuration to the spacer 103c of Embodiment 4, not only a similar effect to that of the module 200 of Embodiment 1 but also a similar effect to that of the module of Embodiment 2 and Embodiment 4 can be obtained.

[Embodiment 6]

Figure 13:
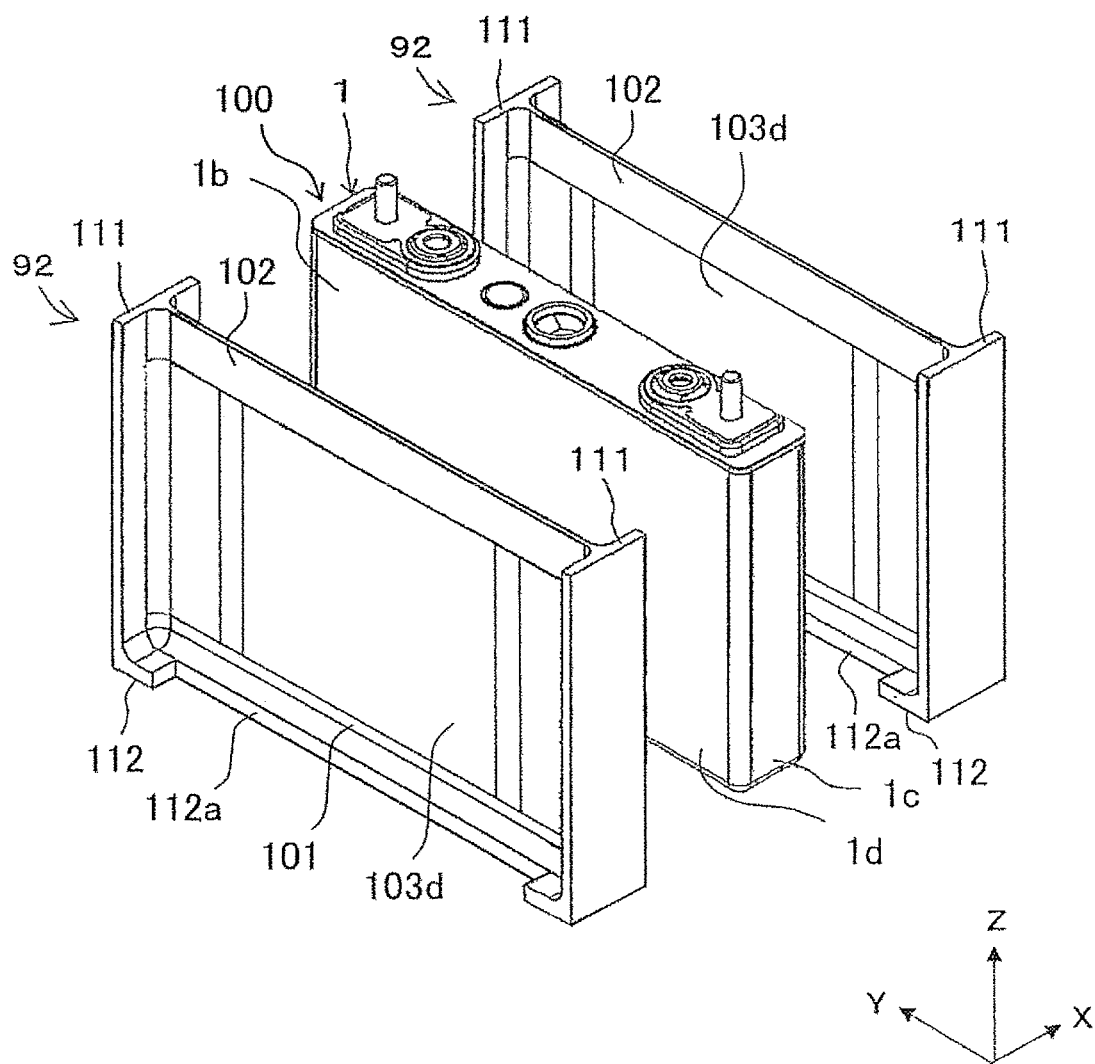
FIG. 13 is an exploded perspective view of a module according to Embodiment 6.
Figure 14:
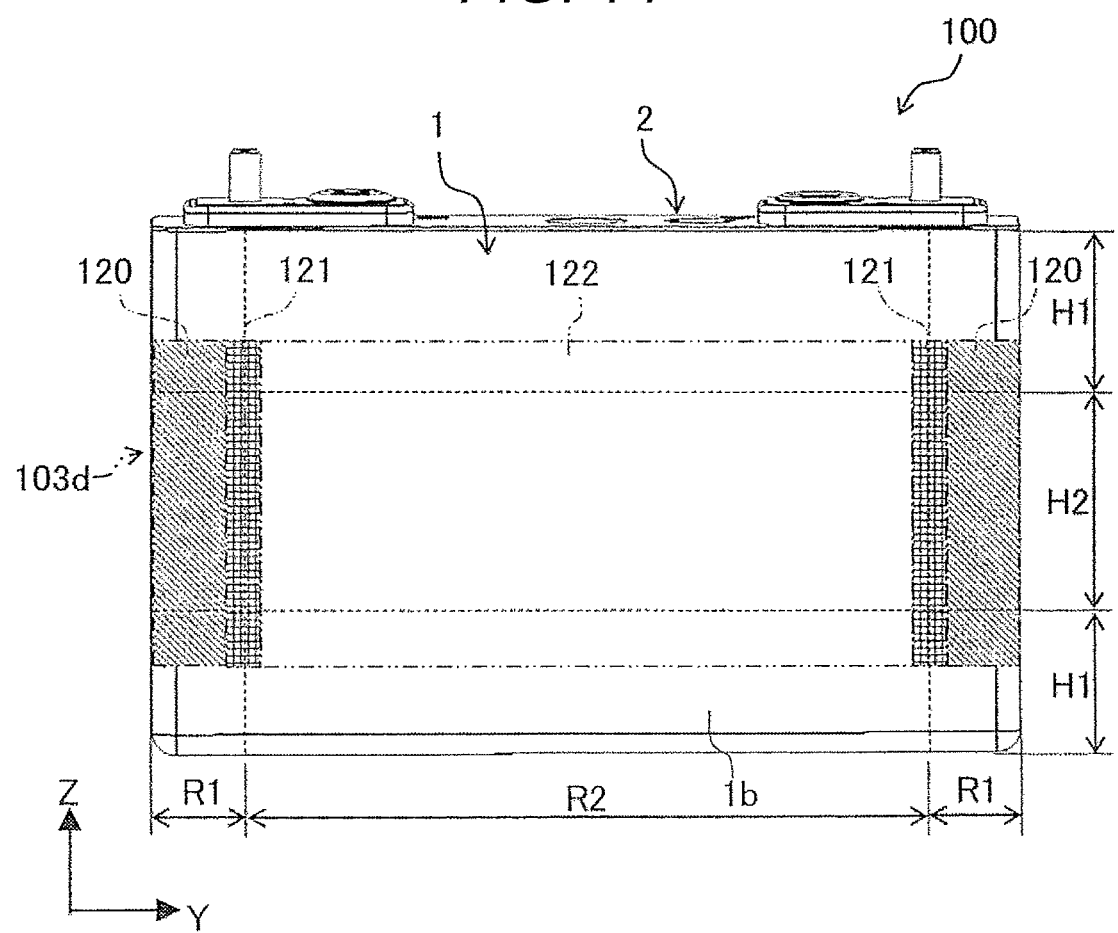
FIG. 14 is a front view which indicates a positional relationship between a spacer and a rectangular secondary battery of the module according to Embodiment 6.

Next, an assembled cell of the present invention according to Embodiment 6 is described with reference to FIGS. 1 to 4, FIG. 13 and FIG. 14. FIG. 13 is a perspective view of an exploded rectangular secondary battery module as the assembled cell of this embodiment, which corresponds to FIG. 6 of Embodiment 1. FIG. 14 is a front view which indicates a positional relationship between a rectangular secondary battery 100 and an intermediate part spacer 103d of the module of this embodiment, which corresponds to FIG. 8 of Embodiment 1.

The intermediate part spacer 103d of the module of this embodiment is provided as one piece in a height direction (Z-direction) of the rectangular secondary battery 100, and its lower end is connected to a lower part spacer 101 and its upper end is connected to an upper part spacer 102. Further, an intermediate cell holder 92 and an end cell holder 93 respectively have a notch part 112a on a bottom plate 112 for cooling the rectangular secondary battery 100 instead of the openings 111a, 111b and the slots 114, 115 of the side plate 111. When the rectangular secondary battery 100 is assembled to a cell holder 91, the notch part 112a exposes a bottom surface 1d of the battery can 1 from the bottom plate 112 of the cell holders 92, 93 to make it possible to cool the rectangular secondary battery 100. Other configurations of the module of this embodiment are the same as those of the module 200 of the above-described Embodiment 1, and therefore the same reference numerals are assigned to the same configurations and the explanation of the configurations is omitted.

The spacer 103d of this embodiment has a similar configuration to the spacer 103 shown in FIG. 7 and FIG. 8 of Embodiment 1 except that the spacer 103d is provided as one piece in the height direction of the rectangular secondary battery 100. Namely, the spacer 103d has a contact part 120 which contacts with a width direction end region R1 of a wide side surface 1*b* of the battery can 1, a facing part 122 which faces a width direction intermediate region R2 of the wide side surface 1*b*, and an inclined surface 121 which is adjacent to both ends of the facing part 122 in a width direction of the wide side surface 1*b* of the battery can 1.

Further, the inclined surface 121 is inclined such that a thickness of the spacer 103*d* is decreased in a direction toward the width direction intermediate region R2 from the width direction end region R1. With such a configuration, the inclined surface 121 is inclined along the wide side surface 1*b* of the battery can 1 which is expanded in a convex curved manner in which the thickness of the center part of the battery can 1 is the largest. Accordingly, when the wide side surface 1*b* of the expanded battery can 1 is pressed by the contact part 120 or the facing part 122 of the spacer 103*d*, stress concentration on the wide side surface 1*b* of the battery can 1 can be prevented by the spacer 103. Thus, both of enhancing a reliability of the battery can 1 and reducing a battery performance degradation become possible.

Accordingly, according to the module of this embodiment, similar to the module 200 of Embodiment 1, positioning accuracy of a rectangular secondary battery 100 can be enhanced by stably holding the width direction end region R1 of the wide side surface 1*b* of the battery can 1 which forms a battery container 2 of the rectangular secondary battery 100 by the contact parts 120, 120 of the spacers 103*d*, 103*d*. Further, stress concentration on the wide side surface 1*b* can be prevented by the inclined surface 121, and expansion of the battery container 2 can be suppressed by the facing part 122 which faces the width direction intermediate region R2 of the wide side surface 1*b*. Further, since the wide side surface 1*b* of the battery can 1 is pressed by the spacer 103*d* which is formed as one piece having a large area compared to the spacers 103 of Embodiment 1, which is divided into a plurality of pieces, expansion of the wide side surface 1*b* of the battery can 1 can be effectively suppressed and the battery performance degradation can be effectively reduced.

[Embodiment 7]

Figure 15:
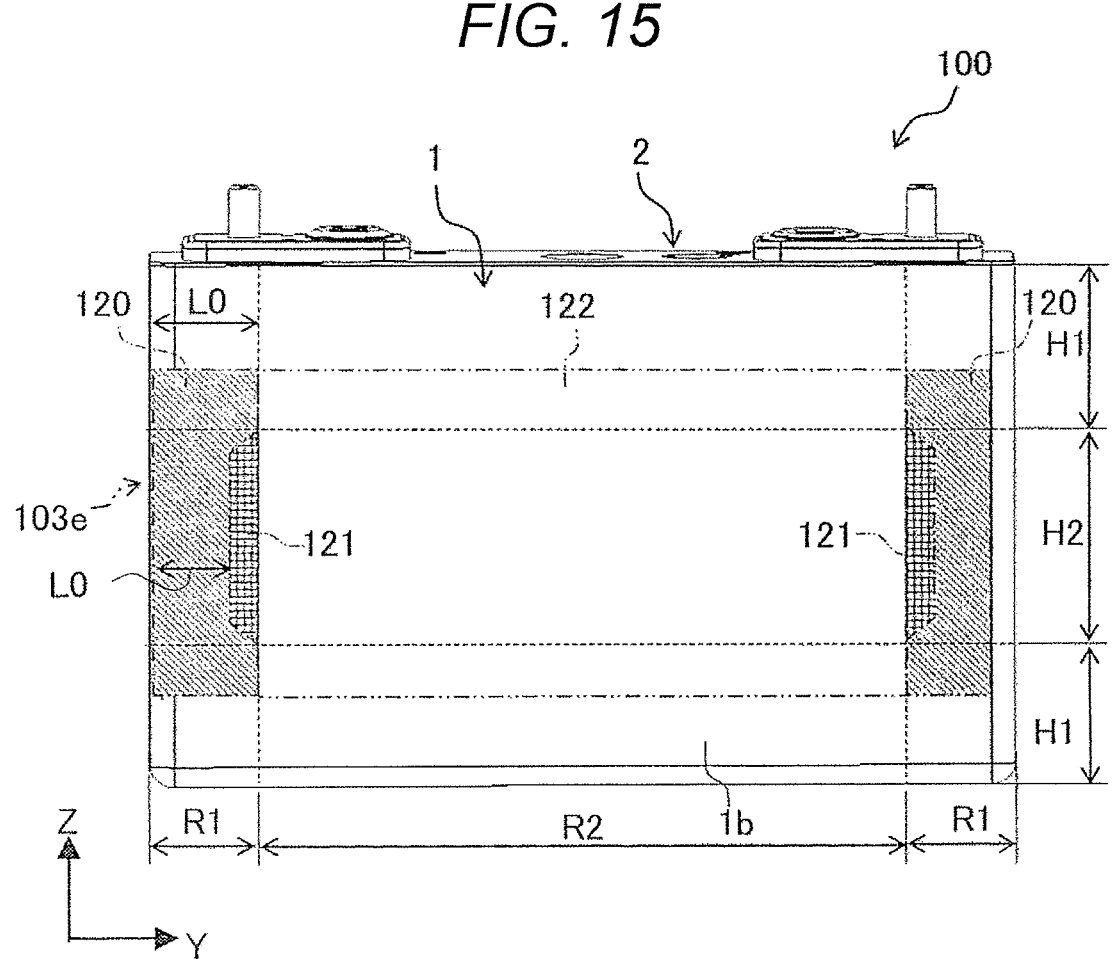
FIG. 15 is a front view which indicates a positional relationship between a spacer and a rectangular secondary battery of a module according to Embodiment 7.

Next, an assembled cell of the present invention according to Embodiment 7 is described with reference to FIGS. 1 to 4, FIG. 13 and FIG. 15. FIG. 15 is a front view which indicates a positional relationship between a rectangular secondary battery 100 and an intermediate part spacer 103*e* of a module of this embodiment, which corresponds to FIG. 8 of Embodiment 1.

The intermediate part spacer 103*e* of the module of this embodiment is, similar to the intermediate part spacer 103*d* of Embodiment 6, provided as one piece in a height direction (Z-direction) of the rectangular secondary battery 100. Further, an inclined surface 121 of the intermediate part spacer 103*e* is, similar to the intermediate part spacers 103, 103*a* of Embodiment 2 shown in FIG. 9, arranged at a position facing a height direction intermediate region H2 of a wide side surface 1*b* of a battery can 1, and arranged between a contact part 120 and a facing part 122 in a width direction (Y-direction) of the wide side surface 1*b*. On the other hand, the inclined surface 121 is not provided at a position facing a height direction end region H1 of the wide side surface 1*b*.

Further, similar to Embodiment 2, a length L0 of the contact part 120 along the width direction of the wide side surface 1*b* becomes asymptotically longer in a direction toward the height direction end region H1 from the height direction intermediate region H2. Other configurations of the module of this embodiment are the same as those of the module 200 of the above-described Embodiment 1, and therefore the same reference numerals are assigned to the same configurations and the explanation of the configurations is omitted.

According to the module of this embodiment, since the intermediate part spacer 103*e* is provided as one piece in the height direction of the rectangular secondary battery 100, a similar effect to that of the intermediate part spacer 103*d* of Embodiment 6 is obtained. Further, since the length L0 of the contact part 120 along the width direction of the wide side surface 1*b* becomes asymptotically longer in the direction toward the height direction end region H1 from the height direction intermediate region H2, similar to the spacer 103*a* of Embodiment 2, a width direction end region R1 can be held stably by the contact part 120 of the spacer 103*a* in the height direction end region H1 of the wide side surface 1*b* of the battery can 1.

[Embodiment 8]

Figure 16:
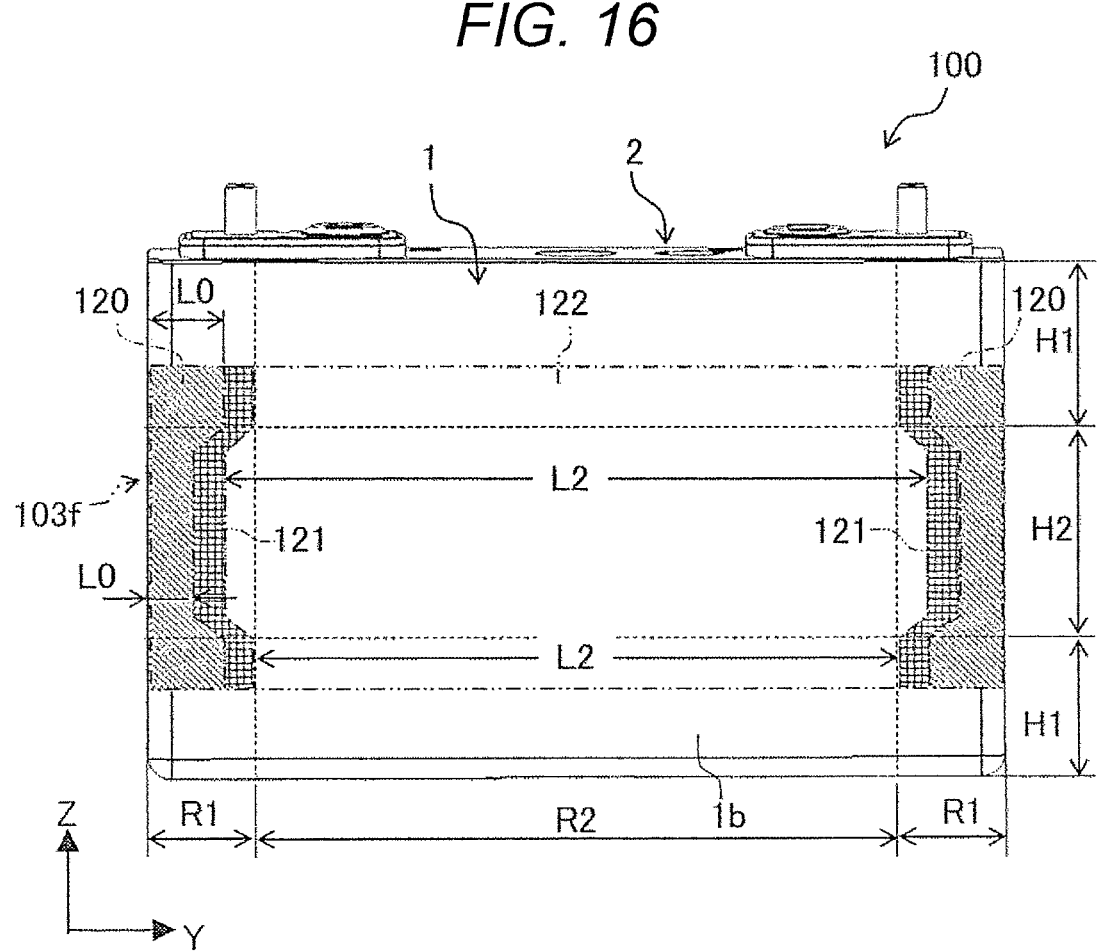
FIG. 16 is a front view which indicates a positional relationship between a spacer and a rectangular secondary battery of a module according to Embodiment 8.

Next, an assembled cell of the present invention according to Embodiment 8 is described with reference to FIGS. 1 to 4, FIG. 13 and FIG. 16. FIG. 16 is a front view which indicates a positional relationship between a rectangular secondary battery 100 and an intermediate part spacer 103*f* of a module of this embodiment, which corresponds to FIG. 8 of Embodiment 1.

The intermediate part spacer 103*f* of the module of this embodiment is, similar to the intermediate part spacer 103*d* of Embodiment 6, provided as one piece in a height direction (Z-direction) of the rectangular secondary battery 100. An inclined surface 121 of the intermediate part spacer 103*f* is, similar to the intermediate part spacers 103, 103*b* of Embodiment 3 shown in FIG. 10, arranged at a position facing both of a height direction end region H1 and a height direction intermediate region H2 of a wide side surface 1*b*, and arranged between a contact part 120 and a facing part 122 in a width direction (Y-direction) of the wide side surface 1*b*.

Further, similar to the intermediate part spacers 103, 103*b* of Embodiment 3 shown in FIG. 10, in the inclined surface 121 of the intermediate part spacer 103*f*, a length L2 of the facing part 122 facing the height direction intermediate region H2 of the wide side surface 1*b* of a battery can 1 with respect to the width direction of the wide side surface 1*b* is longer than a length L2 in the same direction of the facing part 122 facing the height direction end region H1. Namely, the length L2 of the facing part 122 along the width direction of the wide side surface 1*b* becomes asymptotically longer in a direction toward the height direction intermediate region H2 from the height direction end region H1.

Further, a length L0 of the contact part 120 in the same direction of the spacer 103*f* which faces the height direction end region H1 of the wide side surface 1*b* of the battery can 1 is longer than a length L0 in the same direction of the contact part 120 which faces the height direction intermediate region H2. Namely, the length L0 of the contact part 120 along the width direction of the wide side surface 1*b* of the battery can 1 becomes asymptotically longer toward the height direction end region H1 from the height direction intermediate region H2. Other configurations of the module of this embodiment are the same as those of the module 200 of the above-described Embodiment 1, and therefore the same reference numerals are assigned to the same configurations and the explanation of the configurations is omitted.

According to the module of this embodiment, since the intermediate part spacer 103*f* is provided as one piece in the height direction of the rectangular secondary battery 100, a similar effect to that of the module of Embodiment 6 is obtained. Further, since the length L2 of the facing part 122 along the width direction of the wide side surface 1*b* becomes asymptotically longer in the direction toward the height direction intermediate region H2 from the height direction end region H1 and the length L0 of the contact part 120 along the same direction becomes asymptotically longer in the direction toward the height direction end region H1 from the height direction intermediate region H2, a similar effect to that of the module of Embodiment 3 can be obtained.

[Embodiment 9]

Figure 17:
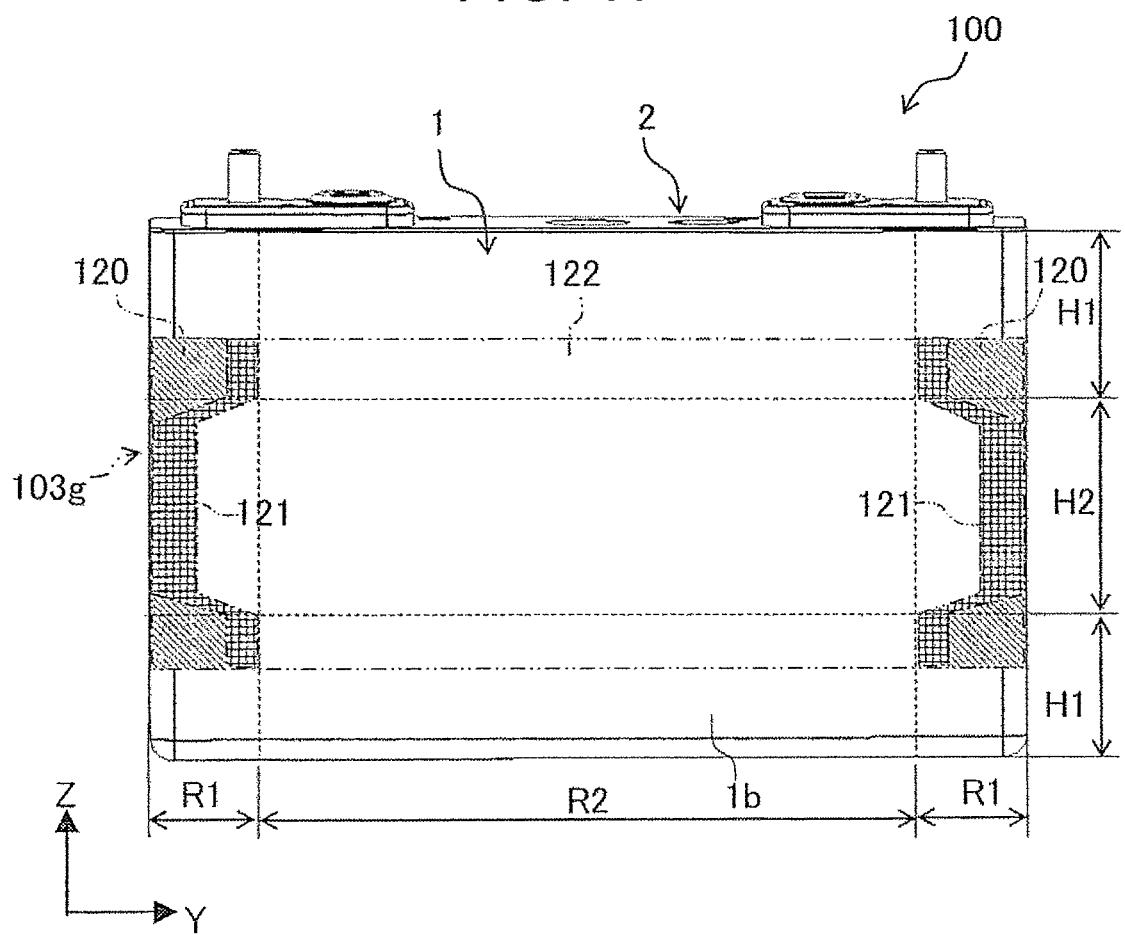
FIG. 17 is a front view which indicates a positional relationship between a spacer and a rectangular secondary battery of a module according to Embodiment 9.

Next, an assembled cell of the present invention according to Embodiment 9 is described with reference to FIGS. 1 to 4, FIG. 13 and FIG. 17. FIG. 17 is a front view which indicates a positional relationship between a rectangular secondary battery 100 and an intermediate part spacer 103*g* of a module of this embodiment, which corresponds to FIG. 8 of Embodiment 1.

The intermediate part spacer 103*g* of the module of this embodiment is, similar to the intermediate part spacer 103*d* of Embodiment 6, provided as one piece in a height direction (Z-direction) of the rectangular secondary battery 100.

In the intermediate part spacer 103*g*, similar to the intermediate part spacers 103, 103*c* of Embodiment 4 shown in FIG. 11, an inclined surface 121 is arranged at a position facing a height direction end region H1 of a wide side surface 1*b*, and arranged between a contact part 120 and a facing part 122 in a width direction (Y-direction) of the wide side surface 1*b*. On the other hand, the inclined surface 121 is arranged at a position facing a height direction intermediate region H2, and arranged at both end parts of the wide side surface 1*b* of a battery can 1 in the width direction. Other configurations of the module of this embodiment are the same as those of the module 200 of the above-described Embodiment 1, and therefore the same reference numerals are assigned to the same configurations and the explanation of the configurations is omitted.

According to the module of this embodiment, since the intermediate part spacer 103*g* is provided as one piece in the height direction of the rectangular secondary battery 100, a similar effect to that of the module of Embodiment 6 is obtained. Further, since the inclined surface 121 is arranged at the position facing the height direction end region H1 of the wide side surface 1*b* and arranged between the contact part 120 and the facing part 122, and the inclined surface 121 is arranged at the position facing a height direction intermediate region H2 and arranged at both end parts in the width direction, a similar effect to that of the module of Embodiment 4 can be obtained.

[Embodiment 10]

Figure 18:
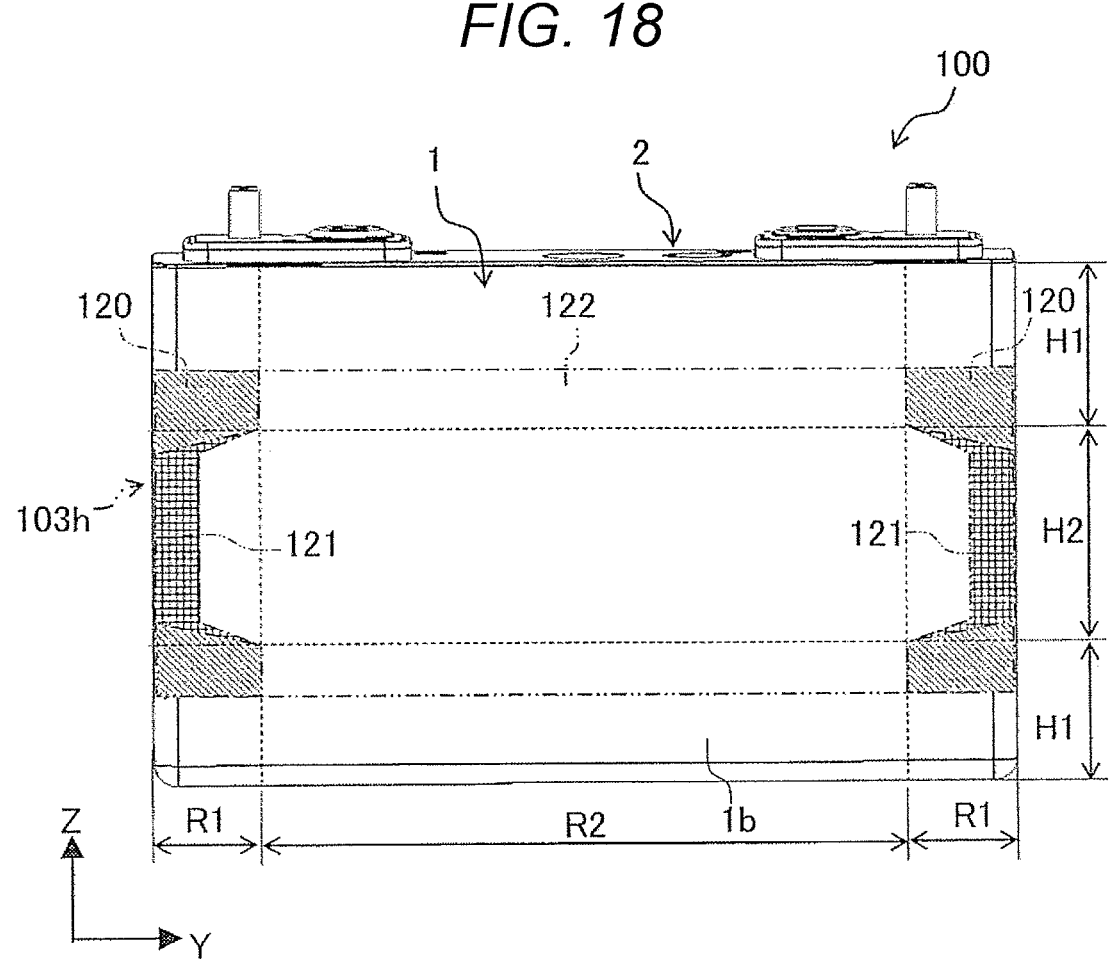
FIG. 18 is a front view which indicates a positional relationship between a spacer and a rectangular secondary battery of a module according to Embodiment 10.

Next, an assembled cell of the present invention according to Embodiment 10 is described with reference to FIG. 1 to FIG. 4, FIG. 13 and FIG. 18. FIG. 18 is a front view which indicates a positional relationship between a rectangular secondary battery 100 and an intermediate part spacer 103*h* of a module of this embodiment, which corresponds to FIG. 8 of Embodiment 1.

The intermediate part spacer 103*h* of the module of this embodiment is, similar to the intermediate part spacer 103*d* of Embodiment 6, provided as one piece in a height direction (Z-direction) of the rectangular secondary battery 100.

The intermediate part spacer 103*h* has, similar to the intermediate part spacers 103*a*, 103*c* of Embodiment 5 shown in FIG. 12, a contact part 120 and a facing part 122 at a position facing a height direction end region H1, and the intermediate part spacer 103*h* does not have an inclined surface 121 at the position facing the height direction end region H1. Further, the intermediate part spacer 103*h* has, similar to the intermediate part spacers 103*a*, 103*c* of Embodiment 5, the inclined surface 121 and the facing part 122 at a position facing a height direction intermediate region H2, and the intermediate part spacer 103*h* does not have the contact part 120 at the position facing the height direction intermediate region H2.

According to the module of this embodiment, since the intermediate part spacer 103*h* is provided as one piece in the height direction of the rectangular secondary battery 100, a similar effect to that of the module of Embodiment 6 is obtained. Further, since the contact part 120 and the facing part 122 are provided at the position facing the height direction end region H1 and the inclined surface 121 and the facing part 122 are provided at the position facing the height direction intermediate region H2, a similar effect to that of the module of Embodiment 5 is obtained.

As described above, Embodiments according to the present invention are described in detail with reference to the drawings, however the specific configuration is not limited to these embodiments, and various design changes within the scope of the present invention may be also included in the present invention.

REFERENCE SIGNS LIST 1 battery can (battery container)
1*b* wide side surface
2 battery container
3 wound group (electrode group)
6 battery cover (battery container)
32 negative electrode
34 positive electrode
100 rectangular secondary battery
103 spacer
120 contact part
121 inclined surface
122 facing part
200 module (assembled cell)
L0 length of the contact part
L2 length of the facing part
R1 width direction end region
R2 width direction intermediate region
H1 height direction end region
H2 height direction intermediate region
X thickness direction
Y width direction
Z height direction

The invention claimed is:

1. An assembled cell, comprising:
a plurality of rectangular secondary batteries, each of which has a battery container formed in a flat box shape, and an electrode group in which a positive electrode and a negative electrode are wound, the electrode group being housed in the battery container; and a spacer which is interposed between the rectangular secondary batteries, the assembled cell being formed by the rectangular secondary batteries laminated in a thickness direction,
wherein the spacer includes:
a contact part which contacts with a width direction end region of a wide side surface of the battery container,
a facing part which faces a width direction intermediate region of the wide side surface, and
an inclined surface that has an asymptotically decreasing thickness in the width direction from the contact part to the facing part, wherein there is a discontinuity in a surface of the spacer between the inclined surface and the facing part and the discontinuity causes a gap between the facing part and the battery container to be formed, wherein the contact part and the facing part are aligned in the width direction of the wide side surface via the inclined surface and surfaces of the contact part and the facing part which face the wide side surface are respectively provided as a flat surface parallel to the width direction and a height direction of the wide side surface, and wherein a contact surface area of the spacer in a height direction end region is larger than the contact surface area of the spacer in a height direction intermediate region.

2. The assembled cell according to claim 1, wherein a length of the contact part along the width direction of the wide side surface is configured to become longer in a direction toward the height direction end region from the height direction intermediate region of the wide side surface.

3. The assembled cell according to claim 1, wherein a length of the facing part along the width direction of the wide side surface is configured to become longer in a direction toward the height direction intermediate region from the height direction end region of the wide side surface.

4. The assembled cell according to claim 3, wherein
the spacer includes the contact part, the inclined surface and the facing part at a position facing the height direction end region, and
the spacer includes the inclined surface and the facing part at a position facing the height direction intermediate region.

5. The assembled cell according to claim 1, wherein the spacer is divided into a plurality of pieces with respect to the height direction of the wide side surface.

* * * * *